United States Patent
Bando

(10) Patent No.: US 11,091,021 B2
(45) Date of Patent: Aug. 17, 2021

(54) POWER PLANT

(71) Applicant: HONDA MOTOR CO., LTD., Tokyo (JP)

(72) Inventor: Masashi Bando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 438 days.

(21) Appl. No.: 16/321,236

(22) PCT Filed: Apr. 28, 2017

(86) PCT No.: PCT/JP2017/016900
§ 371 (c)(1),
(2) Date: Jan. 28, 2019

(87) PCT Pub. No.: WO2018/037627
PCT Pub. Date: Mar. 1, 2018

(65) Prior Publication Data
US 2019/0176609 A1 Jun. 13, 2019

(30) Foreign Application Priority Data
Aug. 24, 2016 (JP) .............................. JP2016-163242

(51) Int. Cl.
*F16H 48/10* (2012.01)
*B60K 6/52* (2007.10)
(Continued)

(52) U.S. Cl.
CPC .................. *B60K 6/52* (2013.01); *B60K 1/02* (2013.01); *B60K 6/365* (2013.01); *B60K 6/383* (2013.01);
(Continued)

(58) Field of Classification Search
CPC .......... B60K 6/52; B60K 17/20; B60K 17/12; B60K 7/00; B60K 6/44; B60K 1/02;
(Continued)

(56) References Cited

U.S. PATENT DOCUMENTS

2012/0100948 A1 * 4/2012 Lin ........................... F16H 3/54
475/149
2014/0256490 A1 * 9/2014 Honda ................... B60K 6/547
475/5
(Continued)

FOREIGN PATENT DOCUMENTS

JP      11-99838 A     4/1999
JP      2008-89075 A     4/2008
(Continued)

OTHER PUBLICATIONS

International Search Report dated Jul. 11, 2017, issued in counterpart International Application No. PCT/JP2017/016900 (3 pages).

*Primary Examiner* — Justin Holmes
(74) *Attorney, Agent, or Firm* — Westerman, Hattori, Daniels & Adrian, LLP

(57) ABSTRACT

A power plant is provided which is capable of not only achieving the improvement in responsiveness, weight reduction, and manufacturing cost reduction of the power plant, but also enhancing the efficiency of the vehicle. The rotational speeds of first to third rotary elements satisfy a collinear relationship in which the rotational speeds are aligned in a single straight line in a collinear chart in the mentioned order, with the first and second rotary elements being connected to a first rotating electric machine and wheels, respectively, and first and second blocking/connecting members of a first one-way clutch being connected to the first and second rotary elements, respectively. In a case where the first and second rotary elements rotate in a first predetermined rotational direction by transmission of rota- (Continued)

tional motive power from the first rotating electric machine, transmission of rotational motive power from the first blocking/connecting member to the second blocking/connecting member is blocked. In a case where the second and first rotary elements rotate in the first predetermined rotational direction by transmission of rotational motive power from the wheels, transmission of rotational motive power from the second blocking/connecting member to the first blocking/connecting member is connected. A second one-way clutch allows rotation of the third rotary element in the first predetermined rotational direction, and prevents rotation of the third rotary element in a direction opposite to the first predetermined rotational direction.

7 Claims, 16 Drawing Sheets

(51) Int. Cl.

| | | |
|---|---|---|
| *B60K 6/383* | (2007.10) | |
| *B60K 7/00* | (2006.01) | |
| *F16H 1/36* | (2006.01) | |
| *B60K 6/44* | (2007.10) | |
| *B60K 1/02* | (2006.01) | |
| *F16H 48/36* | (2012.01) | |
| *F16H 1/28* | (2006.01) | |
| *B60K 17/12* | (2006.01) | |
| *B60K 17/16* | (2006.01) | |
| *B60K 6/365* | (2007.10) | |
| *B60K 6/48* | (2007.10) | |
| *B60K 17/356* | (2006.01) | |
| *B60K 6/40* | (2007.10) | |
| *B60L 50/16* | (2019.01) | |

(52) U.S. Cl.
CPC .................. *B60K 6/44* (2013.01); *B60K 6/48* (2013.01); *B60K 7/00* (2013.01); *B60K 17/12* (2013.01); *B60K 17/20* (2013.01); *B60K 17/356* (2013.01); *F16H 1/28* (2013.01); *F16H 1/36* (2013.01); *F16H 48/10* (2013.01); *F16H 48/36* (2013.01); *B60K 6/40* (2013.01); *B60L 50/16* (2019.02); *B60Y 2200/92* (2013.01); *B60Y 2400/427* (2013.01); *B60Y 2400/73* (2013.01); *B60Y 2400/82* (2013.01); *Y02T 10/62* (2013.01)

(58) Field of Classification Search
CPC ........ B60K 6/365; B60K 6/48; B60K 17/356; B60K 6/383; B60K 6/40; F16H 1/36; F16H 48/36; F16H 1/28; F16H 48/10; B60L 50/16; B60Y 2200/92; B60Y 2400/427; B60Y 2400/73; B60Y 2400/82; Y02T 10/7072; Y02T 10/62
See application file for complete search history.

(56) References Cited

U.S. PATENT DOCUMENTS

2015/0105205 A1\* 4/2015 Kurosaki ............... B60K 6/445
  475/5
2016/0152130 A1\* 6/2016 Kim ...................... B60K 6/383
  475/5

FOREIGN PATENT DOCUMENTS

| JP | 2010-235051 A | 10/2010 |
| JP | 2015-122871 A | 7/2015 |
| JP | 2016-101878 A | 6/2016 |

\* cited by examiner

POWER PLANT

TECHNICAL FIELD

This invention relates to a power plant for driving wheels.

BACKGROUND ART

Conventionally, as a power plant of this kind, there has been known one disclosed e.g. in PTL 1. This power plant is for driving left and right wheels of a vehicle on which an engine as a motive power source is installed, and is comprised of first and second planetary gear units of a single pinion type, first and second rotating electric machines as motive power sources, a one-way clutch, a hydraulic brake of a multi-plate type, and a control device for controlling the hydraulic brake. A first sun gear of the first planetary gear unit and a second sun gear of the second planetary gear unit are mechanically connected to the first and second rotating electric machines, respectively, and a first carrier of the first planetary gear unit and a second carrier of the second planetary gear unit are mechanically connected to the left and right wheels, respectively. Further, the one-way clutch and the hydraulic brake are attached to a first ring gear of the first planetary gear unit and a second ring gear of the second planetary gear unit, and the one-way clutch is configured to prevent reverse rotations of the first and second ring gears.

In the conventional power plant configured as above, in a case where the left and right wheels are driven by the first and second rotating electric machines, braking of the first and second ring gears by the hydraulic brake is released by controlling the hydraulic brake by the control device. Further, in this case, rotational motive power output from the first and second rotating electric machines is transmitted to the first and second sun gears, respectively, and is further transmitted to the left and right wheels, respectively, via the respective first and second carriers, using the braking force of the one-way clutch acting on the first and second ring gears as a reaction force.

Further, during decelerating travel of the vehicle, the first and second ring gears are braked by the hydraulic brake by controlling the hydraulic brake by the control device, and rotational motive power transmitted from the left and right wheels to the first, and second carriers is transmitted to the first and second rotating electric machines via the first and second sun gears, using the braking force of the hydraulic brake acting on the first and second ring gears as a reaction force, and regeneration is performed by the first and second rotating electric machine using the transmitted rotational motive power. In this case, as is apparent from the fact that the first and second ring gears are controlled, the rotational speeds of the first and second sun gears become higher than the rotational speeds of the first and second carriers. That is, the rotational motive power of the left and right wheels is transmitted to the first and second rotating electric machines in a state increased in speed, respectively.

CITATION LIST

Patent Literature 1

[PTL 1]: Japanese Laid-Open Patent Publication (Kokai) No. 2010-235051

SUMMARY OF INVENTION

Technical Problem

As described above, in the conventional power plant, when switching between the regeneration by the first and second rotating electric machines using the rotational motive power from the left and right wheels, and the driving of the left and right wheels by the first and second rotating electric machines, it is required to switch braking by the hydraulic brake and release of the braking, and hence the responsiveness of the switching becomes relatively low. Further, since an actuator for actuating the hydraulic brake is required, the weight and manufacturing costs of the entire power plant are increased accordingly. Furthermore, when the braking by the hydraulic brake is released and powering is not being performed by the first and second rotating electric machines, plates of the hydraulic brake of the multi-plate type are always dragged into rotation, and hence, particularly when the hydraulic brake is a wet type, large dragging losses are caused by shear resistance due to the viscosity of lubricating oil therefor, which lowers the efficiency of the vehicle.

The present invention has been made to provide a solution to the above-described problems, and an object thereof is to provide a power plant which is capable of not only achieving the improvement in responsiveness, weight reduction, and manufacturing cost reduction of the power plant, but also enhancing the efficiency of the vehicle.

Solution to Problem

To attain the above object, the invention according to claim 1 is a power plant 1, 31, 51 for driving wheels (left and right rear wheels WL and WR in the embodiment (hereinafter, the same applies throughout this section)), comprising a first rotating electric machine (rear motor 3, first rear motor 32) that is capable of performing powering which converts input electric power to rotational motive power, for output, and regeneration which converts input rotational motive power to electric power, a first differential gear (planetary gear unit PS, first planetary gear unit PS1) that includes a first rotary element (sun gear S, first sun gear S1), a second rotary element (carrier C, first carrier C1), and a third rotary element (ring gear R, first ring gear R1) which are rotatable about a first rotational axis, and is configured such that rotational speeds of the first to third rotary elements satisfy a collinear relationship in which the rotational speeds of the first to third rotary elements are aligned in a single straight line in a collinear chart in the mentioned order, the first rotary element being mechanically connected to the first rotating electric machine, and the second rotary element being mechanically connected to the wheels, a first one-way clutch 4 that includes a first blocking/connecting member (inner 4a) and a second blocking/connecting member (outer 4b) which are mechanically connected to the first and second rotary elements, respectively, and is configured such that in a case where the first and second rotary elements rotate in a first predetermined rotational direction by transmission of rotational motive power from the first rotating electric machine, when a rotational speed of the first rotary element becomes higher than a rotational speed of the second rotary element, transmission of rotational motive power from the first blocking/connecting member to the second blocking/connecting member is blocked, whereas in a case where the second and first rotary elements rotate in the first predetermined rotational direction by transmission of rotational motive power from the wheels, when the rotational speed of the second rotary element becomes not higher than the rotational speed of the first rotary element, transmission of rotational motive power from the second blocking/connecting member to the first blocking/connecting member is connected, and a second one-way clutch 5 that is configured to allow the third rotary element to rotate in the first predetermined rotational direction, and prevent the third rotary element from rotating in a direction opposite to the first predetermined rotational direction.

According to this configuration, the first differential gear includes the first to third rotary elements, and is configured such that the rotational speeds of the first to third rotary elements satisfy the collinear relationship in which the rotational speeds of the first to third rotary elements are aligned in the single straight line in the collinear chart in the mentioned order. Further, the first and second rotary elements are mechanically connected to the first rotating electric machine and the wheels, respectively. Furthermore, the first one-way clutch includes the first blocking/connecting member and the second blocking/connecting member which are mechanically connected to the first and second rotary elements, respectively.

In the case where the first and second rotary elements are rotating in the first predetermined rotational direction by transmission of rotational motive power from the first rotating electric machine, when the rotational speed of the first rotary element becomes higher than the rotational speed of the second rotary element, the transmission of rotational motive power from the first blocking/connecting member to the second blocking/connecting member of the first one-way clutch is blocked, whereas in the case where the second and first rotary elements rotate in the first predetermined rotational direction by transmission of rotational motive power from the wheels, when the rotational speed of the first rotary element becomes not higher than the rotational speed of the second rotary element, the transmission of rotational motive power from the second blocking/connecting member to the first blocking/connecting member is connected. Further, the second one-way clutch allows the third rotary element to rotate in the first predetermined rotational direction, and prevents the third rotary element from rotating in the direction opposite to the first predetermined rotational direction (hereinafter referred to as the "first reverse rotational direction").

In the power plant configured as above, for example, when powering is performed by the first rotating electric machine, and rotational motive power for causing the first rotary element to rotate in the first predetermined rotational direction is transmitted from the first rotating electric machine to the first rotary element, a torque transmitted to the first rotary element acts to cause the second rotary element to rotate in the first predetermined rotational direction, and acts to cause the third rotary element to rotate in the above-mentioned first reverse rotational direction. As described above, the rotation of the third rotary element in the first reverse rotational direction is automatically prevented by the second one-way clutch. Therefore, in this case, rotational motive power transmitted from the first rotating electric machine to the first rotary element is transmitted to the second rotary element using the braking force of the second one-way clutch acting on the third rotary element, as a reaction force, and is further transmitted to the wheels. With this, the rotational motive power from the first rotating electric machine is transmitted to the wheels in a state reduced in speed by the first differential gear.

Further, in this case, since the third rotary element is stopped, and the rotational speeds of the first to third rotary elements are in the collinear relationship, the rotational speed of the first rotary element becomes higher than the rotational speed of the second rotary element, and hence the transmission of the rotational motive power from the first blocking/connecting member to the second blocking/connecting member is automatically blocked.

Further, for example, when the powering of the first rotating electric machine is stopped, and rotational motive power for causing the second rotary element to rotate in the first predetermined rotational direction is transmitted from the wheels to the second rotary element, a torque transmitted to the second rotary element acts to cause the first and third rotary elements to rotate in the first predetermined rotational direction. As described above, the rotation of the third rotary element in the first predetermined rotational direction is automatically allowed by the second one-way clutch. Therefore, in this case, the braking force of the second one-way clutch does not act on the third rotary element, so that the third rotary element idly rotates in the first predetermined rotational direction.

Further, in this case, when regeneration is performed by the first rotating electric machine, and rotational motive power transmitted from the wheels to the first rotating electric machine via the second and first rotary elements is converted to electric power, the rotational speed of the first rotary element is lowered with respect to the rotational speed of the second rotary element by the braking force of the first rotating electric machine, generated by the regeneration, so that the transmission of rotational motive power from the second blocking/connecting member to the first blocking/connecting member of the first one-way clutch is automatically connected, whereby the first to third rotary elements are caused to rotate in unison with each other. Thus, it is possible to transmit the rotational motive power transmitted from the wheels to the second rotary element, to the first rotating electric machine via the first rotary element, without transmitting all the rotational motive power to the idly rotating third rotary element, and properly convert the rotational motive power to electric power.

As is clear front the above, in the power plant according to the present invention, when switching between the regeneration by the first rotating electric machine using the rotational motive power from the wheels, and the driving of the wheels by the powering of the first rotating electric machine, differently from the above-described conventional power plant, there is no need to switch between braking by a hydraulic brake and release of the braking, using a control device. Further, when performing this switching, the connection/blocking of the transmission of rotational motive power between the first and second blocking/connecting members at the first one-way clutch, and the prevention of the rotation of the third rotary element in the first reverse rotational direction and the allowing of the rotation of the third rotary element in the first predetermined rotational direction by the second one-way clutch are automatically performed with a change in the operation of the first rotating electric machine, and hence it is possible to improve the responsiveness of the switching. Further, an actuator for actuating the conventional hydraulic brake can be dispensed with, and hence it is possible to reduce the weight of the entire power plant and manufacturing costs of the entire power plant. Further, differently from the conventional power plant, it is possible to prevent occurrence of large dragging losses of the hydraulic brake, and hence it is possible to enhance the efficiency of the vehicle.

The invention according to claim 2 is the power plant 1, 31, 51 according to claim 1, wherein the first differential gear is formed by a first planetary gear unit PS1 (planetary gear unit PS) of a single pinion type, and wherein the first rotary element, the second rotary element, and the third rotary element are a first sun gear S1 (sun gear S), a first carrier C1 (carrier C), and a first ring gear R1 (ring gear R) of the first planetary gear unit PS1, respectively.

According to this configuration, since the first planetary gear unit of the existing single pinion type is used as the first differential gear, it is possible to further reduce the manufacturing costs of the power plant. Further, since the first sun gear is connected to the first rotating electric machine and the first carrier is connected to the wheels, respectively, it is possible to transmit the rotational motive power from the first-rotating electric machine to the wheels via the first differential gear in a state largely reduced in speed, whereby it is possible to employ a rotating electric machine of which the output torque is relatively small and which is small-sized, as the first rotating electric machine.

The invention according to claim 3 is the power plant 1, 31, 51 according to claim 1 or 2, wherein the first and second one-way clutches 4 and 5 are arranged such that the first and second one-way clutches overlap each other in a direction orthogonal to the first rotational axis.

According to this configuration, the first and second one-way clutches are arranged such that they overlap each other in the direction orthogonal to the first rotational axis, so that compared with a case where the first and second one-way clutches are arranged such that they overlap each other in a direction of extension of the first rotational axis, it is possible to downsize the entire power plant in the direction of extension of the first rotational axis.

The invention according to claim 4 is the power plant 31, 51 according to any one of claims 1 to 3, wherein the wheels are formed by a pair of left and right wheels (left and right rear wheels WL and WR), and wherein the second rotary element is mechanically connected to the left wheel (left rear wheel WL), the power plant further comprising: a second rotating electric machine (second rear motor 33) that is provided separately from the first rotating electric machine, and is capable of performing powering which converts input electric power to rotational motive power, for output, and regeneration which converts input rotational motive power to electric power, a second differential gear (second planetary gear unit PS2) that includes a fourth rotary element (second sun gear S2), a fifth rotary element (second carrier C2), and a sixth rotary element (second ring gear R2) which are rotatable about a second rotational axis, and is configured such that rotational speeds of the fourth to sixth rotary elements satisfy a collinear relationship in which the rotational speeds of the fourth to sixth rotary elements are aligned in a single straight line in a collinear chart in the mentioned order, the fourth rotary element being mechanically connected to the second rotating electric machine, and the fifth rotary element being mechanically connected to the right wheel (right rear wheel WR), a third one-way clutch 34 that includes a third blocking/connecting member (inner 34a) and a fourth blocking/connecting member (outer 34b) which are mechanically connected to the fourth and fifth rotary elements, respectively, and is configured such that in a case where the fourth and fifth rotary elements rotate in a second predetermined rotational direction by transmission of rotational motive power from the second rotating electric machine, when a rotational speed of the fourth rotary element becomes higher than a rotational speed of the fifth rotary element, transmission of rotational motive power from the third blocking/connecting member to the fourth blocking/connecting member is blocked, whereas in a case where the fifth and fourth rotary elements rotate in the second predetermined rotational direction by transmission of rotational motive power from the right wheel, when the rotational speed of the fifth rotary element becomes not higher than the rotational speed of the fourth rotary element, transmission of rotational motive power from the fourth blocking/connecting member to the third blocking/connecting member is connected, and a fourth one-way clutch 52 (second one-way clutch 5) that is configured to allow the sixth rotary element to rotate in the second predetermined rotational direction, and prevent the sixth rotary element from rotating in a direction opposite to the second predetermined rotational direction.

According to this configuration, the wheels are formed by the pair of left and right wheels, and the second rotary element is mechanically connected to the left wheel. Further, the second differential gear includes the fourth to sixth rotary elements, and is configured such that the rotational speeds of the fourth to sixth rotary elements satisfy the collinear relationship in which the rotational speeds of the fourth to sixth rotary elements are aligned in the single straight line in the collinear chart in the mentioned order. Further, the fourth and fifth rotary elements are mechanically connected to the second rotating electric machine and the right wheel, respectively. Furthermore, the third one-way clutch includes the third blocking/connecting member and the fourth blocking/connecting member which are mechanically connected to the fourth and fifth rotary elements, respectively.

In the case where the fourth and fifth rotary elements rotate in the second predetermined rotational direction by transmission of rotational motive power from the second rotating electric machine, when the rotational speed of the fourth rotary element becomes higher than the rotational speed of the fifth rotary element, the transmission of rotational motive power from the third blocking/connecting member to the fourth blocking/connecting member is blocked, whereas in the case where the fifth and fourth rotary elements rotate in the second predetermined rotational direction by transmission of rotational motive power from the right wheel, when the rotational speed of the fourth rotary element becomes not higher than the rotational speed of the fifth rotary element, the transmission of rotational motive power from the fourth blocking/connecting member to the third blocking/connecting member is connected. Further, the fourth one-way clutch allows the sixth rotary element to rotate in the second predetermined rotational direction, and prevents the sixth rotary element from rotating in the direction opposite to the second predetermined rotational direction (hereinafter referred to as the "second reverse rotational direction").

As is clear from the above-described configurations of the second rotating electric machine and the second differential gear, and the functions of the first rotating electric machine and the first differential gear, stated in the description of the invention according to claim 1, in the power plant of the present invention, the following operations, for example, are performed: When rotational motive power for causing the fourth rotary element to rotate in the second predetermined rotational direction is transmitted from the second rotating electric machine to the fourth rotary element by powering of the second rotating electric machine, the rotational motive power transmitted to the fourth rotary element is transmitted to the fifth rotary element using the braking force of the fourth one-way clutch automatically acting on the sixth rotary element, as a reaction force, and is further transmitted to the right wheel. With this, the rotational motive power from the second rotating electric machine is transmitted to the right wheel in a state reduced in speed by the second differential gear.

Further, in this case, since the sixth rotary element is stopped, and the rotational speeds of the fourth to sixth rotary elements are in the collinear relationship, the rotational speed of the fourth rotary element becomes higher than the rotational speed of the fifth rotary element, and hence the transmission of the rotational motive power from the third blocking/connecting member to the fourth blocking/connecting member of the third one-way clutch is automatically blocked.

Furthermore, for example, when the powering of the second rotating electric machine is stopped, rotational motive power for causing the fifth rotary element to rotate in the second predetermined rotational direction is transmitted from the right wheel to the fifth rotary element, a torque transmitted to the fifth rotary element acts to cause the fourth and sixth rotary elements to rotate in the second predetermined rotational direction. As described above, the rotation of the sixth rotary element in the second predetermined rotational direction is automatically allowed by the fourth one-way clutch. Therefore, in this case, the braking force of the fourth one-way clutch does not act on the sixth rotary element, so that the sixth rotary element idly rotates in the second predetermined rotational direction.

Further, in this case, when regeneration is performed by the second rotating electric machine, and rotational motive power transmitted from the wheels to the second rotating electric machine via the fifth and fourth rotary elements is converted to electric power, the rotational speed of the fourth rotary element is lowered with respect to the rotational speed of the fifth rotary element by the braking force of the second rotating electric machine, generated by the regeneration, so that the transmission of the rotational motive power from the fourth blocking/connecting member to the third blocking/connecting member of the third one-way clutch is automatically connected, whereby the fourth to sixth rotary elements are caused to rotate in unison. Thus, it is possible to transmit the rotational motive power transmitted from the wheels to the fifth rotary element, to the second rotating electric machine via the fourth rotary element, without transmitting all the rotational motive power to the idly rotating sixth rotary element, and properly convert the rotational motive power to electric power.

As is clear from the above, in the power plant of the present invention, when switching between regeneration by the second rotating electric machine using the rotational motive power from the right wheel, and driving of the right wheel by the powering of the second rotating electric machine, differently from the above-described conventional power plant, there is no need to switch between braking by the hydraulic brake and release of the braking, using the control device. Further, during this switching, the connection/blocking of the transmission of the rotational motive power between the third and fourth blocking/connecting members at the third one-way clutch, the prevention of the rotation of the sixth rotary element in the second reverse rotational direction by the fourth one-way clutch, and the allowance of the rotation of the sixth rotary element in the second predetermined rotational direction by the fourth one-way clutch are automatically performed with a change in the operation of the second rotating electric machine, so that it is possible to improve the responsiveness of the switching. Further, since the actuator for actuating the conventional hydraulic brake can be dispensed with, it is possible to reduce the weight and manufacturing costs of the entire power plant. The above-described advantageous effects can be similarly obtained for the left wheel, the first rotating electric machine, and the first and second one-way clutches, as stated in the description of the invention according to claim 1.

Further, differently from the conventional power plant, since occurrence of large dragging losses of the hydraulic brake can be prevented for both the left and right wheels, the efficiency of the vehicle can be enhanced. Further, by controlling electric power input to the first and second rotating electric machines and/or electric power generated by the same, it is possible to generate a torque difference between the left and right wheels, whereby it is possible to enhance the turnability of the vehicle.

The invention according to claim 5 is the power plant 31, 51 according to claim 4, wherein the second differential gear is formed by a second planetary gear unit PS2 of the single pinion type, and wherein the fourth rotary element, the fifth rotary element, and the sixth rotary element are a second sun gear S2, a second carrier C2, and a second ring gear R2 of the second planetary gear unit PS2, respectively.

According to this configuration, since the second planetary gear unit of the existing single pinion type is used as the second differential gear, it is possible to further reduce the manufacturing costs of the power plant. Further, since the second sun gear is connected to the second rotating electric machine and the second carrier is connected to the right wheel, respectively, it is possible to transmit the rotational motive power from the second rotating electric machine to the right wheel via the second differential gear in a state largely reduced in speed, whereby a rotating electric machine of which the output torque is relatively small and which is small-sized, can be employed as the second rotating electric machine.

The invention according to claim 6 is the power plant 51 according to claim 4 or 5, wherein the third and fourth one-way clutches 34 and 52 are arranged such that the third and fourth one-way clutches 34 and 52 overlap each other in a direction orthogonal to the second rotational axis.

According to this configuration, the third and fourth one-way clutches are arranged such that they overlap each other in the direction orthogonal to the second rotational axis, so that compared with a case where the third and fourth one-way clutches are arranged such that they overlap each other in a direction of extension of the second rotational axis, it is possible to downsize the entire power plant in the direction of extension of the second rotational axis.

The invention according to claim 7 is the power plant 31 according to claim 4 or 5, wherein the first and second rotation axes coincide with each other, wherein the first and second predetermined rotational directions are set to the same rotational direction, wherein the second and fourth one-way clutches 5 are formed by a single one-way clutch common to each, and wherein the third and sixth rotary elements are connected via the one-way clutch such that the third and sixth rotary elements rotate in unison in the first and second predetermined rotational directions.

According to this configuration, the first rotational axis of the first to third rotary elements, and the second rotational axis of the fourth to sixth rotary elements coincide with each other, and the first predetermined rotational direction, which is a rotational direction of the first to third rotary elements, and the second predetermined rotational direction, which is a rotational direction of the fourth to sixth rotary elements, are set to the same direction. Further, the second and fourth one-way clutches are formed by the single one-way clutch common to each, and hence compared with a case where the two are provided separately from each other, it is possible to achieve downsizing and manufacturing cost reduction of the entire power plant. Furthermore, the third rotary element of the first differential gear, and the sixth rotary element of the second differential gear are connected via this one-way clutch such that they rotate in unison.

For this reason, for example, in a case where the vehicle is turning to the right, and at the same time the second and fifth rotary elements are rotating in the first and second predetermined rotational directions, when the steering angle of the vehicle is relatively large, relatively large electric power is input to the first rotating electric machine, relatively small electric power is generated by the second rotating electric machine, and the electric power input to the first rotating electric machine is made considerably larger than the electric power generated by the second rotating electric machine, whereby it is possible to transmit a relatively large drive torque from the first rotating electric machine to the left wheel, which is an outer turning wheel, and transmit a relatively small braking torque from the second rotating electric machine to the right wheel, which is an inner turning wheel.

In this case, the drive torque from the first rotating electric machine acts to cause the third and sixth rotary elements to rotate in directions opposite to the first and second predetermined rotational directions, and the torque from the wheels acts to cause the third and sixth rotary elements to rotate in the first and second predetermined rotational directions, using the braking force of the second rotating electric machine acting on the fourth rotary element as a reaction force. Further, the drive torque acting on the third and sixth rotary elements from the first rotating electric machine becomes larger than the torque acting on the third and sixth rotary elements from the wheels. As a consequence, the third and sixth rotary elements are stopped by the braking of the one-way clutch (see FIG. 13 referred to hereinafter). From the above, in this case, the rotational motive power from the first rotating electric machine is transmitted to the left wheel in a state reduced in speed by the first differential gear, and the rotational motive power from the right wheel is transmitted to the second rotating electric machine in a state increased in speed by the second differential gear, and is converted to electric power. Further, since the torque of the left wheel is relatively largely increased with respect to the torque of the right wheel, it is possible to generate a relatively large torque difference between the two wheels.

Further, for example, in the case where the vehicle is turning to the right, and at the same time the second and fifth rotary elements are rotating in the first and second predetermined rotational directions, when the steering angle of the vehicle is relatively small, very small electric power is input to the first rotating electric machine, relatively small electric power is generated by the second rotating electric machine, and the electric power generated by the second rotating electric machine is made slightly larger than the electric power input to the first rotating electric machine, whereby it is possible to transmit a relatively small drive torque from the first rotating electric machine to the left wheel, which is the outer turning wheel, and transmit a relatively large braking torque from the second rotating electric machine to the right wheel, which is the inner turning wheel.

In this case as well, the drive torque from the first rotating electric machine acts to cause the third and sixth rotary elements to rotate in the directions opposite to the first and second predetermined rotational directions, and the torque from the wheels acts to cause the third and sixth rotary elements to rotate in the first and second predetermined rotational directions. Differently from the above-described case, the torque acting on the third and sixth rotary elements from the wheels becomes larger than the drive torque acting on the third and sixth rotary elements from the first rotating electric machine. As a consequence, the third and sixth rotary elements idly rotate in the first and second predetermined rotational directions (see FIG. 14 referred to hereinafter). From the above, in this case, part of the rotational motive power of the right wheel is distributed to the second rotating electric machine and the third rotary element via the second differential gear, so that the rotational motive power distributed to the second rotating electric machine is converted to electric power, and the rotational motive power distributed to the third rotary element is transmitted to the left wheel together with the rotational motive power from the first rotating electric machine. Further, since the torque of the left wheel is relatively slightly increased with respect to the torque of the right wheel, it is possible to generate a relatively small torque difference between the two wheels.

Further, during left turning of the vehicle, by controlling the first and second rotating electric machines, it is possible to perform an operation which is left-right reversed to the above-described operation.

BRIEF DESCRIPTION OF DRAWINGS

FIG. 3 A block diagram of an ECU for controlling a rear motor of the power plant appearing in FIG. 2, and the like.

FIG. 9 A block diagram of an ECU for controlling first and second rear motors of the power plant appearing in FIG. 8, and the like.

DESCRIPTION OF EMBODIMENTS

Figure 1:
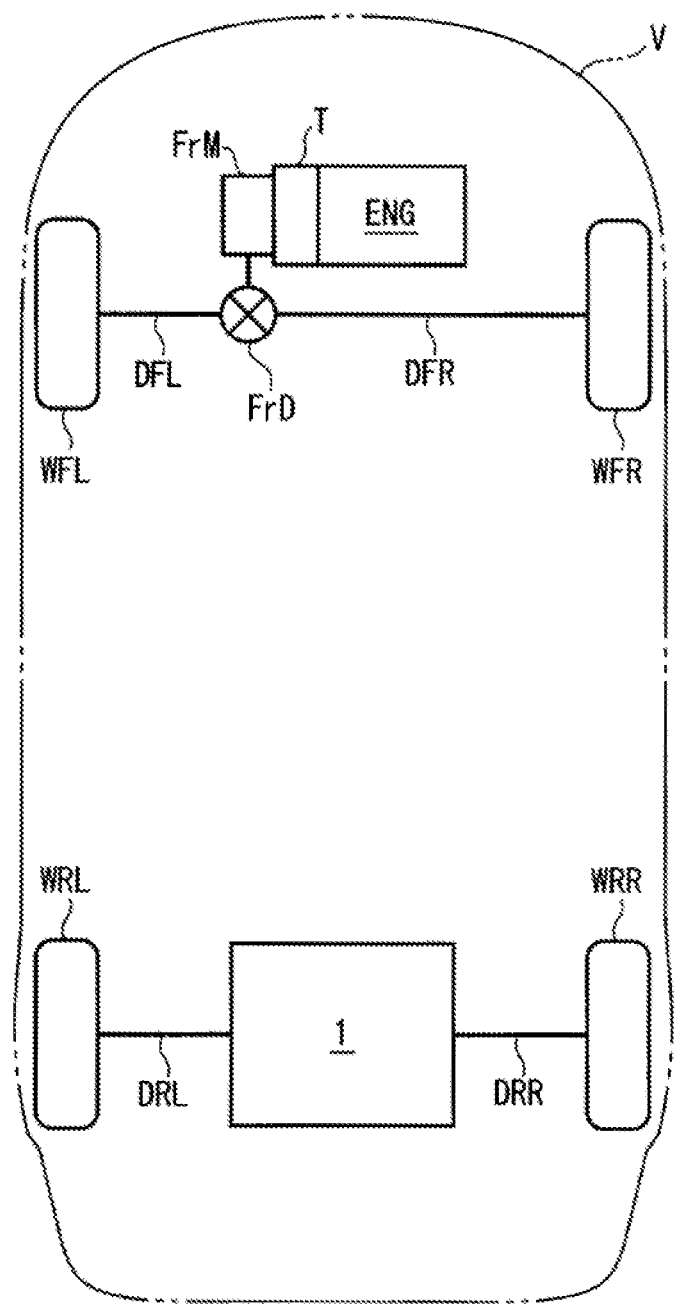
FIG. 1 A diagram schematically showing a vehicle to which a power plant according to a first embodiment of the present invention is applied.

The invention will now be described in detail with reference to drawings showing preferred embodiments thereof. FIG. 1 schematically shows a vehicle V to which a power plant 1 according to a first embodiment of the present invention is applied. The vehicle V is e.g. a hybrid four-wheel vehicle, and includes left and right front wheels WFL and WFR as steer wheels, and left and right rear wheels WRL and WRR. Further, an engine ENG as a motive power source, a front motor FrM, and a stepped automatic transmission T are installed on a front part of the vehicle V.

The engine ENG is e.g. a gasoline engine, and is connected to the left and right front wheels WFL and WFR via the automatic transmission T, the front motor FrM, a front differential gear FrD, and left and right front drive shafts DFL and DFR. The front motor FrM is e.g. an AC motor, and is connected to a battery 12, referred to hereinafter, via an electric circuit comprised e.g. of an inverter. The front motor FrM is capable of performing powering in which electric power input from the battery 12 is converted to rotational motive power, and regeneration in which input rotational motive power is converted to electric power (power generation). The electric power regenerated by the front motor FrM is charged into the battery 12. Further, the intake air amount, the fuel injection amount, the fuel injection timing, and the ignition timing of the engine ENG are controlled by an ECU 2, described hereinafter, appearing in FIG. 3, and the operation of the front motor FrM is controlled by the ECU 2 via the above-mentioned electric circuit.

Figure 2:
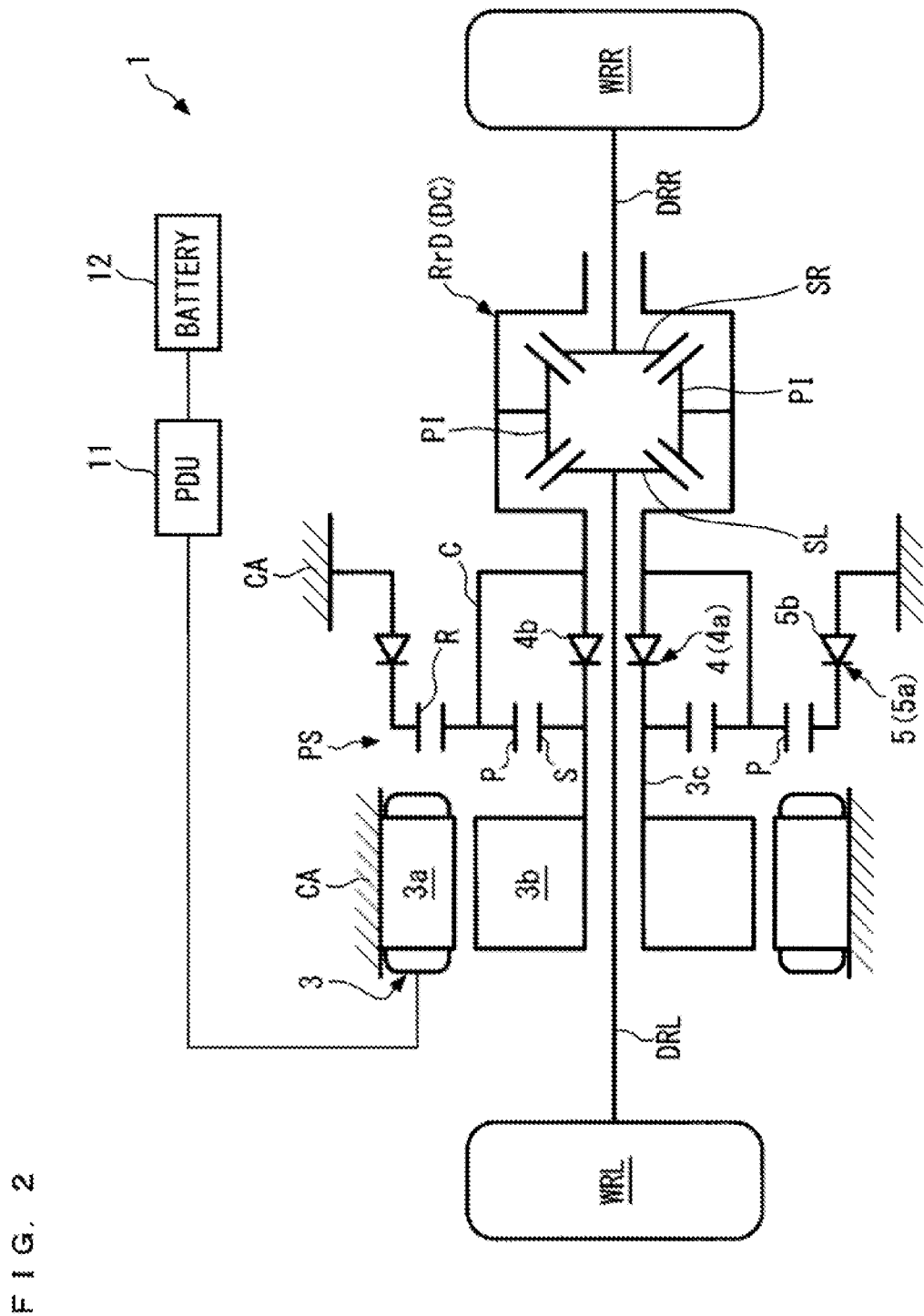
FIG. 2 A skeleton diagram showing the power plant according to the first embodiment of the present invention together with left and right rear wheels of the vehicle to which the power plant is applied.

As shown in FIG. 2, the power plant 1 includes a rear motor 3 as a motive power source, a planetary gear unit PS, and a rear differential gear RrD. The rear motor 3, the planetary gear unit PS, and the rear differential gear RrD are disposed coaxially with each other, and are arranged between the left and right rear wheels WRL and WRR from the left side in the mentioned order. Hereinafter, the left and right rear wheels WRL and WRR are generically referred to as the "rear wheels WRL and WRR", as deemed appropriate.

The rear motor 3 is e.g. an AC motor, and includes a stator 3a formed e.g. by a plurality of iron cores and coils, and a rotor 3b formed e.g. by a plurality of magnets. Similar to the above-described front motor FrM, the rear motor 3 is configured to be capable of performing powering and regeneration. The stator 3a is fixed to an immovable casing CA integrally formed with a chassis (not shown) of the vehicle V, and the rotor 3b is formed into a hollow cylindrical shape. In the rear motor 3, during powering thereof, electric power input to the stator 3a is output to the rotor 3b in a state converted to rotational motive power. Further, during regeneration, the rotational motive power input to the rotor 3b is output to the stator 3a in a state converted to electric power.

Figure 3:
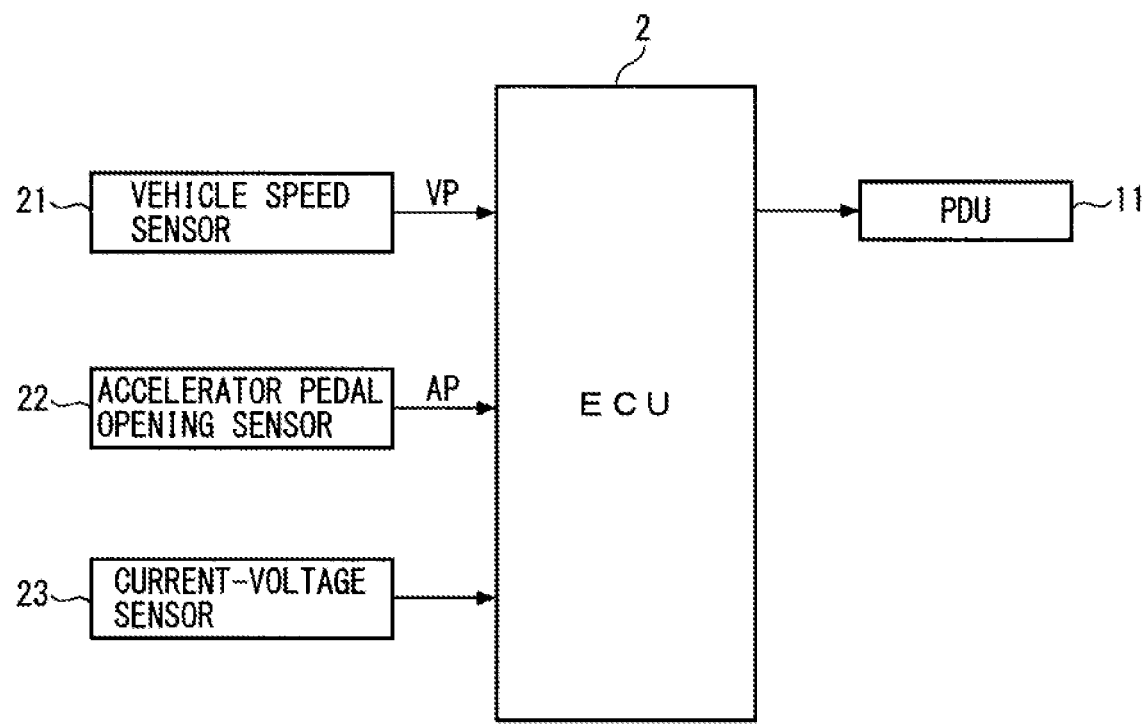

Further, the stator 3a of the rear motor 3 is electrically connected to the battery 12, which is capable of being charged and discharged, via a power drive unit (hereinafter referred to as the "PDU") 11, and is capable of supplying and receiving electric energy to and from the battery 12. The PDU 11 is formed by an electric circuit comprised e.g. of an inverter. As shown in FIG. 3, the above-described ECU 2 is electrically connected to the PDU 11. The ECU 2 controls the PDU 11 to thereby control electric power input to the stator 3a, electric power generated by the stator 3a, and the rotational speed of the rotor 3b.

Further, the direction of normal rotation of the rotor 3b is set to the same direction as the direction of normal rotation of the rear wheels WRL and WRR. Hereinafter, the direction of normal rotation of the rotor 3b and the direction of normal rotation of the rear wheels WRL and WRR are referred to as the "normal rotational direction", as deemed appropriate. Further, rotation of various rotary elements, such as the rear wheels WRL and WRR, in the normal rotational direction is referred to as "normal rotation", and rotation thereof in a direction opposite to the normal rotational direction (hereinafter referred to as the "reverse rotational direction") is referred to as "reverse rotation". Furthermore, the rotor 3b is integrally formed with a hollow cylindrical rotating shaft 3c. The rotating shaft 3c extends rightward from the rotor 3b. Further, a left rear drive shaft DRL, referred to hereinafter, is relatively rotatably fitted inside the rotor 3b and the rotating shaft 3c.

The above-mentioned planetary gear unit PS is of a general single pinion type, and is comprised of a sun gear S, a ring gear R disposed around an outer periphery of the sun gear S, a plurality of pinion gears P in mesh with the gears S and R, and a rotatable carrier C rotatably supporting the pinion gears P. As is widely known, the sun gear S and the pinion gears P are formed by externally toothed gears, and the ring gear R is formed by an internally toothed gear. The sun gear S, the carrier C, and the ring gear R are rotatable with respect to each other about the same rotational axis. Further, the sun gear S is coaxially and integrally formed with the rotating shaft 3c of the rear motor 3, and is rotatable in unison with the rotating shaft 3c and the rotor 3b.

Furthermore, the carrier C integrally includes support shafts rotatably supporting the pinion gears P, an annular plate-shaped flange to which the support shafts are fixed, a hollow cylindrical shaft fixed to an inner peripheral surface of the flange. The hollow cylindrical shaft is coaxially and integrally attached to a differential case DC, referred to hereinafter, of the above-mentioned rear differential gear RrD. The carrier C is rotatable in unison with the differential case DC. Further, the left rear drive shaft DRL is relatively rotatably provided inside the carrier C.

The above-mentioned rear differential gear RrD is formed by a bevel gear type differential gear, and includes the differential case DC, which is hollow, a plurality of pinion gears PI rotatably supported by the differential case DC, and a left side gear SL and a right side gear SR in mesh with the pinion gears PI. The pinion gears PI and the left and right side gear SL and SR are formed by bevel gears. The left side gear SL is coaxially and integrally provided on a right end of the left rear drive shaft DRL, and the right side gear SR is coaxially and integrally provided on a left end of a right rear drive shaft DRR. The left and right rear wheels WRL and WRR are connected to a left end of the left rear drive shaft BRL and a right end of the right rear drive shaft DRR, respectively. The left side gear SL, the left rear drive shaft DRL, and the left rear wheel WRL are rotatable in unison with each other, and the right side gear SR, the right rear drive shaft DRR, and the right rear wheel WRR are rotatable in unison with each other.

As described above, in the power plant 1, the sun gear S of the planetary gear unit PS is mechanically connected to the rear motor 3, and the carrier C is mechanically connected to the rear wheels WRL and WRR e.g. via the rear differential gear RrD.

Further, the power plant 1 is further includes a first one-way clutch 4 and a second one-way clutch 5. The first one-way clutch 4 is a so-called roller type one-way clutch, and includes an inner 4a and an outer 4b, which are annular, and a plurality of rollers and springs (none of which are shown). Each roller is disposed between the two 4a and 4b in a state accommodated in a recess formed in one of the inner 4a and the outer 4b. The roller is urged by an associated one of the above-mentioned springs, and is movable between an engaged position where the roller is engaged with the inner 4a and the outer 4b, and a retracted position where the engagement with the two 4a and 4b is released. Further, the inner 4a is coaxially attached to the sun gear S, and is rotatable in unison with the sun gear S. The outer 4b is coaxially attached to the carrier C, and is rotatable in unison with the carrier C. The left rear drive shaft DRL is relatively rotatably fitted inside the inner 4a and the outer 4b.

In the first one-way clutch 4 constructed as above, in a case where the sun gear S and the carrier C are performing normal rotation in accordance with transmission of rotational motive power from the rear motor 3, when the rotational speed of the sun gear S becomes higher than the rotational speed of the carrier C, the rollers are moved to their above-mentioned retracted positions by being pressed via their surfaces in contact with the other of the inner 4a and the outer 4b, causing release of the engagement thereof with the two 4a and 4b. As a consequence, the transmission of rotational motive power from the inner 4a to the outer 4b is blocked. Further, in a case where powering of the rear motor 3 is stopped, and the carrier C and the sun gear S are performing normal rotation by transmission of rotational motive power from the rear wheels WRL and WRR, when the rotational speed of the sun gear S becomes not higher than the rotational speed of the carrier C, the rollers are moved to their above-mentioned engaged positions by being pressed via their surfaces in contact with the other of the inner 4a and the outer 4b, causing engagement thereof with the two 4a and 4b. As a consequence, the transmission of rotational motive power from the outer 4b to the inner 4a is connected.

The above-mentioned second one-way clutch 5 is constructed similar to the first one-way clutch 4, and hence hereinafter, it will be briefly described hereafter. The second one-way clutch 5 includes an inner 5a and an outer 5b, which are annular, and a plurality of rollers and springs (none of which are shown). Each roller is movable between an engaged position where the roller is engaged with the inner 5a and the outer 5b, and a retracted position where the engagement with the two 5a and 5b is released. Further, the inner 5a is coaxially attached to the ring gear R, and is capable of normal rotation in unison with the ring gear R. The carrier C is relatively rotatably provided inside the inner 5a. The outer 5b is fixed to the casing CA. Furthermore, the second one-way clutch 5 is arranged such that it overlaps the first one-way clutch 4 in a radial direction of the planetary gear unit PS, i.e. in a direction orthogonal to the rotational axis of the sun gear S, the carrier C, and the ring gear R.

In the second one-way clutch 5 constructed as above, when a torque that causes normal rotation is transmitted to the ring gear R, the rollers are moved to their above-mentioned retracted positions by being pressed via their surfaces in contact with one of the inner 5a and the outer 5b, causing release of the engagement thereof with the two 5a and 5b. As a consequence, the normal rotation of the ring gear R is allowed. Further, when a torque that causes reverse rotation is transmitted to the ring gear R, the rollers are moved to their above-mentioned engaged positions by being pressed via their surfaces in contact with the one of the inner 5a and the outer 5b, causing engagement thereof with the two 5a and 5b. As a consequence, the reverse rotation of the ring gear R is prevented.

Further, to the ECU 2, a detection signal indicative of a vehicle speed VP of the vehicle V is input from a vehicle speed sensor 21, and a detection signal indicative of an operation amount of an accelerator pedal (not shown) of the vehicle V (hereinafter referred to as the "accelerator pedal opening") AP is input from an accelerator pedal opening sensor 22. Furthermore, to the ECU 2, detection signals indicative of current and voltage values of electric current flowing into and out of the battery 12 are input from a current-voltage sensor 23. The ECU 2 calculates a state of charge SOC of the battery 12 based on the detection signals from the current-voltage sensor 23.

The ECU 2 is implemented by a microcomputer comprised of an I/O interface, a CPU, a RAM, and a ROM, and is installed on the vehicle V. The ECU 2 selects one of travel modes of the vehicle V based on the detection signals from the aforementioned sensors 21 to 23, according to control programs stored in the ROM, and controls the operations and the like of the engine ENG, the front motor FrM, and the rear motor 3, based on the selected travel mode.

Figure 4:
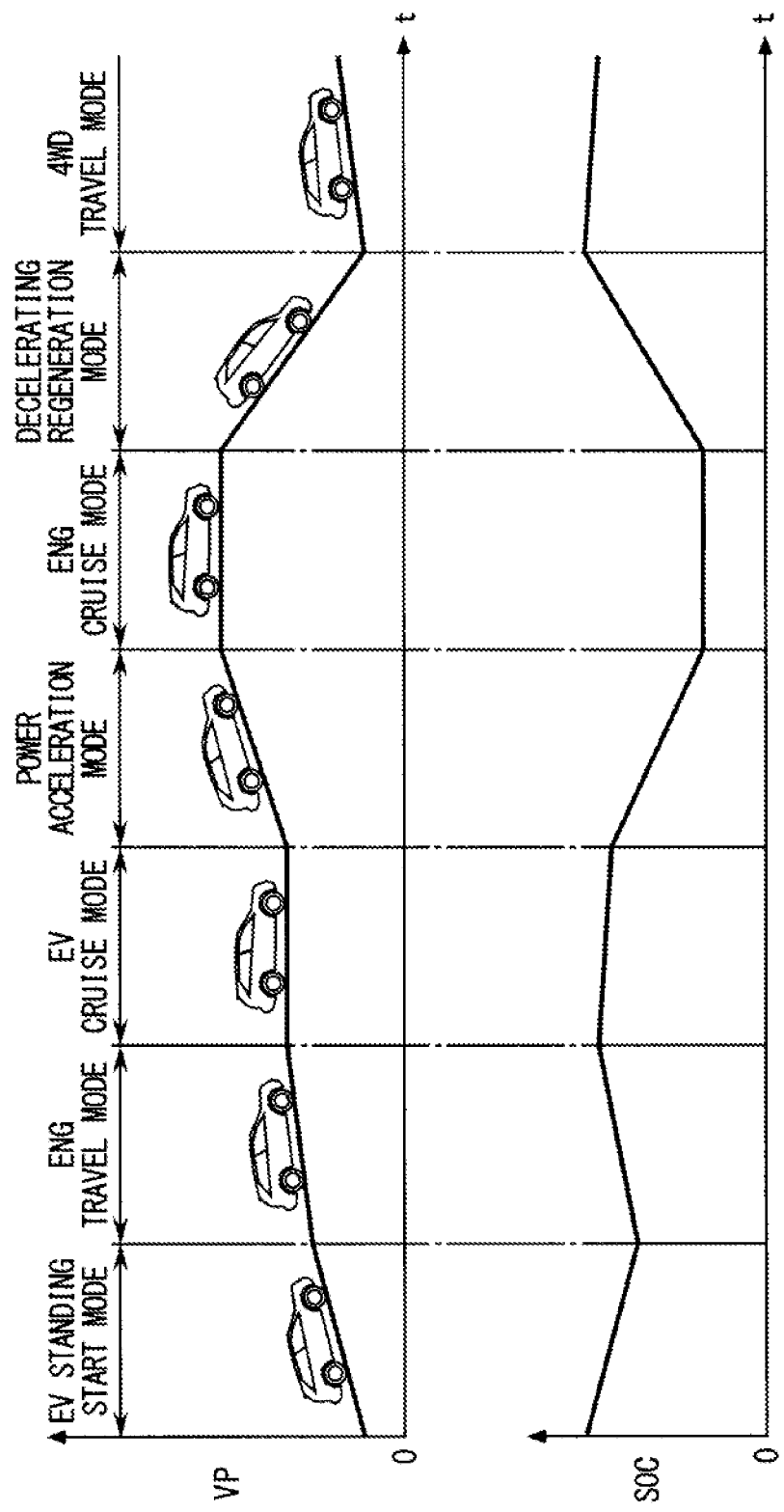
FIG. 4 A diagram showing a relationship between travel modes of the vehicle, vehicle speeds, and states of charge of a battery.

As shown in FIG. 4, as the travel modes, there are provided an EV standing start mode, an ENG travel mode, an EV cruise mode, a power acceleration mode, an ENG cruise mode, a decelerating regeneration mode, and a 4 WD travel mode, and one of these plurality of travel modes is selected as a travel mode of the vehicle V. FIG. 4 shows an example of a relationship between the above travel modes, and the vehicle speed VP and the state of charge SOC of the battery 12. The outline of the travel modes is as follows:

EV standing start mode: A travel mode in which the engine ENG is stopped and the vehicle V is caused to start forward using the rear motor 3 as a motive power source ENG travel mode: A travel, mode in which the vehicle V is caused to travel forward using only the engine ENG as a motive power source EV cruise mode: A travel mode in which the engine ENG is stopped and the vehicle V is caused to cruise (travel at an approximately constant vehicle speed) forward using the rear motor 3 as a motive power source Power acceleration mode: A travel mode in which the vehicle V is accelerated forward using the engine ENG and the rear motor 3 as motive power sources ENG cruise mode: A travel mode in which the vehicle V is caused to cruise forward using only the engine ENG as a motive power source Decelerating regeneration mode: A travel mode in which during forward deceleration travel of the vehicle V (when the vehicle V is traveling forward by inertia), regeneration by the front motor FrM using the rotational motive power from the left and right front wheels WFL and WFR, and/or regeneration by the rear motor 3 using the rotational motive power from the left and right rear wheels WRL and WRR are/is performed 4 WD travel mode: A travel mode in which, when the vehicle V is traveling forward on slippery roads (low μ roads), such as a snowy road, all of the left and right front wheels WFL and WFR and rear wheels WRL and WRR are driven using the engine ENG and the rear motor 3 as motive power sources.

Next, the operations of the power plant 1 in the above-described travel modes will be described with reference to FIGS. 5 to 7. As is widely known, in the planetary gear unit PS of the single pinion type, the sun gear S, the carrier C, and the ring gear R are capable of transmitting rotational motive power therebetween, and the rotational speeds of the three S, C, and R are in a collinear relationship in which they are aligned in a single straight line in the mentioned order in a collinear chart indicating the relationship therebetween. Further, as is clear from the above-described connection relationship between various types of rotary elements, the rotational speed of the sun gear S is equal to the rotational speed of the rear motor 3, and assuming that no differential rotation occurs between the left and right rear wheels WRL and WRR, the rotational speed of the carrier C is equal to the rotational speed of the left and right rear wheels WRL and WRR. Furthermore, the inner 4a and the outer 4b of the first one-way clutch 4 are attached to the sun gear S and the carrier C, respectively, and the inner 5a of the second one-way clutch 5 is attached to the ring gear R.

Figure 5:
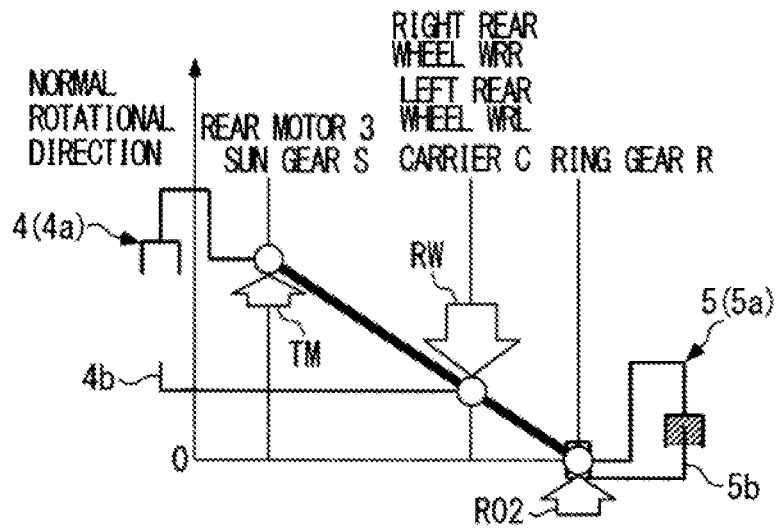
FIG. 5 A collinear chart showing a rotational speed relationship and a torque balance relationship between various types of rotary elements of the power plant shown in FIG. 2, during travel modes for causing the vehicle to travel forward using the rear motor as a motive power source.
Figure 6:
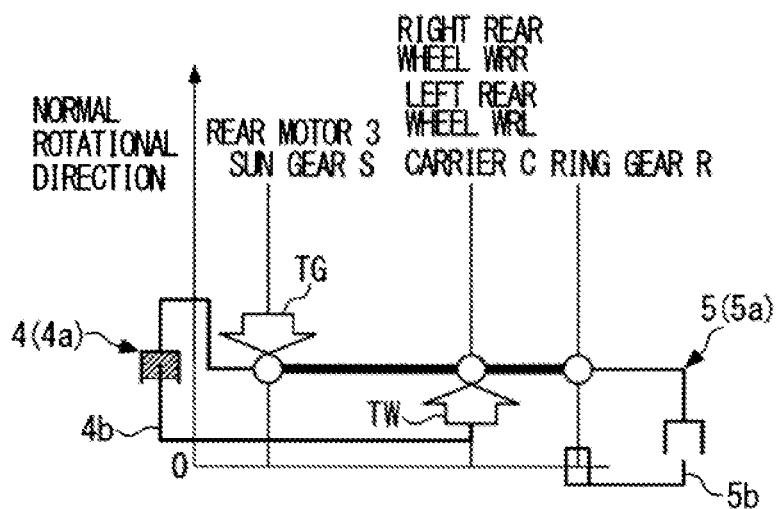
FIG. 6 A collinear chart showing a rotational speed relationship and a torque balance relationship between the various types of rotary elements of the power plant shown in FIG. 2, during a decelerating regeneration mode.
Figure 7:
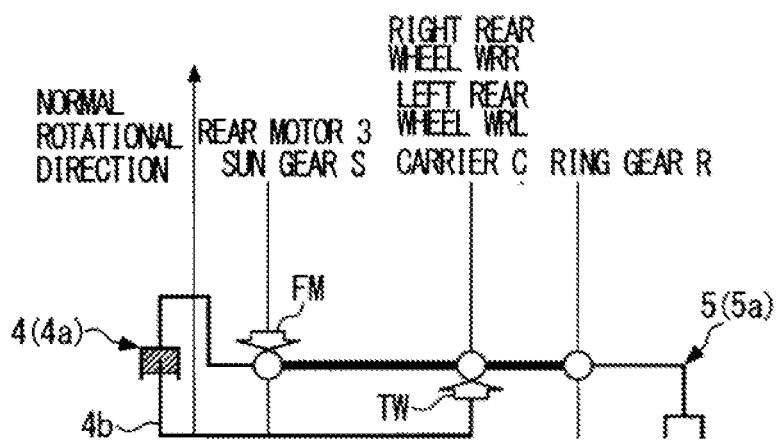
FIG. 7 A collinear chart showing a rotational speed relationship and a torque balance relationship between the various types of rotary elements of the power plant shown in FIG. 2, during travel modes for causing the vehicle to travel forward using a motive power source other than the rear motor.

From the above, the relationship between the rotational speeds of various rotary elements of the power plant 1 is expressed in collinear charts shown in FIGS. 5 to 7. In FIGS. 5 to 7 and other collinear charts, referred to hereinafter, the distance from a horizontal line indicative of 0 to a white circle shown on each vertical line corresponds to the rotational speed of each of the rotary elements.

FIG. 5 shows an example or a rotational speed relationship and a torque balance relationship between the various types of rotary elements in travel modes of the above-described plurality of travel modes, which use the rear motor 3 as a motive power source, i.e. the EV standing start mode, the EV cruise mode, the power acceleration mode, and the 4 WD travel mode. In these travel modes, the powering of the rear motor 3 is performed, and the direction of rotation of the rotor 3b of the rear motor 3 is controlled to the normal rotational direction. In FIG. 5, TM represents a torque of the rear motor 3, generated by the powering of the rear motor 3 (hereinafter referred to as the "rear motor powering torque"), RW represents a reaction force torque of the rear wheels WRL and WRR acting on the carrier C, and RO2 represents a reaction force torque of the second one-way clutch 5.

As shown in FIG. 5, the rear motor powering torque TM acts to cause the sun gear S and the carrier C to perform normal rotation, and acts to cause the ring gear R to perform reverse rotation. As described hereinabove, the reverse rotation of the ring gear R is prevented by the second one-way clutch 5. For this reason, the rear motor powering torque TM transmitted to the sun gear S is transmitted to the carrier C using the reaction force torque RO2 of the second one-way clutch 5 acting on the ring gear R as a reaction force, and is further transmitted to the rear wheels WRL and WRR. In this case, since the sun gear S and the carrier C perform normal rotation, and the rotational speed of the sun gear S performing normal rotation becomes higher than the rotational speed of the carrier C, the transmission of the rotational motive power from the inner 4a to the outer 4b of the first one-way clutch 4 is blocked.

Note that in FIG. 5, the blocking of the transmission of the rotational motive power from the inner 4a to the outer 4b of the first one-way clutch 4 is represented by drawing the two 4a and 4b apart from each other, and the engagement of the inner 5a and the outer 5b of the second one-way clutch 5 with each other via the rollers is represented by drawing the two 5a and 5b such that the two 5a and 5b partially overlap each other, and hatching overlapping portions of them.

As is apparent from FIG. 5, in the travel modes which use the rear motor 3 as a motive power source, the rotational motive power from the rear motor 3 is transmitted to the rear wheels WRL and WRR in a state reduced in speed at a speed reduction ratio of the planetary gear unit PS, defined by the number of gear teeth of the sun gear S and that of gear teeth of the ring gear R. With this, the rear wheels WRL and WRR perform normal rotation, whereby the vehicle V travels forward.

Further, FIG. 6 shows an example of a rotational speed relationship and a torque balance relationship between the various types of rotary elements in the above-described decelerating regeneration mode. In the decelerating regeneration mode, regeneration is performed by the rear motor 3 using the rotational motive power from the rear-wheels WRL and WRR, and electric power generated by the rear motor 3 is charged into the battery 12. In FIG. 6, TG represents a braking torque of the rear motor 3 generated by the regeneration by the rear motor 3 (hereinafter referred to as the "rear motor braking torque"), and TW represents a torque transmitted from the rear wheels WRL and WRR to the carrier C. As shown in FIG. 6, the torque TW transmitted from the rear wheels WRL and WRR to the carrier C acts to cause the sun gear S and the ring gear R to perform normal rotation. As described above, the second one-way clutch 5 allows the normal rotation of the ring gear R. For this reason, in this case, the braking force of the second one-way clutch 5 does not act on the ring gear R, whereby the ring gear R idly rotates in the normal rotational direction.

Further, the sun gear S and the carrier C perform normal rotation, and the rear motor braking torque TG acts to lower the rotational speed of the sun gear S with respect to the rotational speed of the carrier C, whereby the transmission of the rotational motive power from the outer 4b to the inner 4a of the first one-way clutch 4 is connected. This causes the sun gear S, the carrier C, and the ring gear R to rotate in unison with each other. As a consequence, the rotational motive power transmitted from the rear wheels WRL and WRR to the carrier C is transmitted to the rear motor 3 via the sun gear S without all being transmitted to the idly rotating ring gear R, and is converted to electric power by regeneration by the rear motor 3.

Note that in FIG. 6, the connection of the transmission of the rotational motive power from the outer 4b to the inner 4a of the first one-way clutch 4 is represented by drawing the two 4a and 4b such that the two 4a and 4b partially overlap each other, and hatching overlapping portions of them, and release of the engagement between the inner 5a and the outer 5b of the second one-way clutch 5 is represented by drawing the two 5a and 5b apart from each other. The same applies to FIG. 7.

Further, FIG. 7 shows an example of a rotational speed relationship and a torque balance relationship between the various types of rotary elements in travel modes which do not use the rear motor 3 as a motive power source, i.e. the ENG travel mode and the ENG cruise mode. In this case, the PDU 11 is controlled such that no electric current flows through the stator 3a of the rear motor 3. In FIG. 7, FM represents friction of the rear motor 3 (cogging torque, hereinafter referred to as the "rear motor friction"), and TW represents the torque transmitted from the rear wheels WRL and WRR to the carrier C, as described hereinabove.

During the ENG travel mode and during the ENG cruise mode, similar to the case described with reference to FIG. 6, the torque TW transmitted from the rear wheels WRL and WRR to the carrier C acts to cause the sun gear S and the ring gear R to perform normal rotation. Further, similar to the rear motor braking torque TG, the rear motor friction FM acts to lower the rotational speed of the sun gear S with respect to the rotational speed of the carrier C. From the above, in this case as well, the normal rotation of the ring gear R is allowed by the second one-way clutch 5, and the transmission of the rotational motive power from the outer 4b to the inner 4a of the first one-way clutch 4 is connected, whereby the sun gear S, the carrier C, and the ring gear R are caused to rotate in unison with each other.

Differently from the power plant 1, in a case where the torque of a rotating electric machine is transmitted to wheels in an increased state by connecting the rotating electric machine to the wheels via a reduction gear mechanism comprised of a pair of gears, during the ENG travel mode and during the ENG cruise mode, the rotational speed of the rotating electric machine always becomes higher than the rotational speed of the wheels. With this, friction of the rotating electric machine acting on the wheels is increased, so that the efficiency of the vehicle V is lowered.

In contrast, in the power plant 1, as described above, the sun gear S, the carrier C, and the ring gear R rotate in unison with each other during the ENG travel mode and during the ENG cruise mode. Since this makes the rotational speed of the rear motor 3 equal to the rotational speed of the rear wheels WRL and WRR, it is possible to reduce the rear motor friction FM, which in turn makes it possible to enhance the efficiency of the vehicle V.

Further, correspondence between the various types of elements of the first embodiment and various types of elements of the present invention is as follows: The rear motor 3 of the first embodiment corresponds to a first rotating electric machine of the present invention, and the planetary gear unit PS of the first embodiment corresponds to a first differential gear and a first planetary gear unit of the present invention. Further, the sun gear S of the first embodiment corresponds to a first rotary element and a first sun gear of the present invention, the carrier C of the first embodiment corresponds to a second rotary element and a first carrier of the present invention, and the ring gear R of the first embodiment corresponds to a third rotary element and a first ring gear of the present invention. Further, the inner 4a and the outer 4b of the first embodiment correspond to first and second blocking/connecting members of the present invention, and the left and right rear wheels WRL and WRR of the first embodiment correspond to the wheels of the present invention.

As described above, according to the first embodiment, the planetary gear unit PS includes the sun gear S, the carrier C, and the ring gear R, and is configured such that the rotational speeds of the sun gear S, the carrier C, and the ring gear R satisfy a collinear relationship in which they are aligned in a single straight line in the collinear chart in the mentioned order. Further, the sun gear S and the carrier C are mechanically connected to the rear motor 3 and the rear wheels WRL and WRR, respectively, and the first one-way clutch 4 includes the inner 4a and the outer 4b which are mechanically connected to the sun gear S and the carrier C, respectively.

In the case where the sun gear S and the carrier C are performing normal rotation by transmission of the rotational motive power from the rear motor 3, when the rotational speed of the sun gear S becomes higher than the rotational speed of the carrier C, the transmission of the rotational motive power from the inner 4a to the outer 4b of the first one-way clutch 4 is blocked. In the case where the carrier C and the sun gear S perform normal rotation by transmission of the rotational motive power from the rear wheels WRL and WRR, when the rotational speed of the sun gear S becomes not higher than the rotational speed of the carrier C, the transmission of the rotational motive power from the outer 4b to the inner 4a is connected. Further, the second one-way clutch 5 allows the ring gear R to perform normal rotation and prevents the same from performing reverse rotation.

As described with reference to FIG. 5, when powering is performed by the rear motor 3, and rotational motive power for causing the sun gear S to perform normal rotation is transmitted from the rear motor 3 to the sun gear S, the rotational motive power transmitted to the sun gear S is transmitted to the carrier C using the braking force of the second one-way clutch 5 automatically acting on the ring gear R, as a reaction force, and is further transmitted to the rear wheels WRL and WRR. With this, the rotational motive power from the rear motor 3 is transmitted to the rear wheels WRL and WRR in a state reduced in speed by the planetary gear unit PS. Further, in this case, the transmission of the rotational motive power from the inner 4a to the outer 4b of the first one-way clutch 4 is automatically blocked.

Further, as described with reference to FIG. 6, when regeneration is being performed by the rear motor 3 using the rotational motive power from the rear wheels WRL and WRR, the rotational motive power from the rear wheels WRL and WFR is transmitted to the ring gear R via the carrier C, and the normal rotation of the ring gear R is automatically allowed by the second one-way clutch 5, whereby the ring gear R idly rotates in the normal rotational direction. Furthermore, the rotational speed of the sun gear S is lowered with respect to the rotational speed of the carrier C by a braking force generated by regeneration by the rear motor 3, whereby the transmission of the rotational motive power from the outer 4b to the inner 4a of the first one-way clutch 4 is automatically connected, which causes the sun gear S, the carrier C, and the ring gear R to rotate in unison with each other. As described above, it is possible to transmit the rotational motive power transmitted to the carrier C from the rear wheels WRL and WRR, to the rear motor 3 via the sun gear S, without transmitting all the rotational motive power to the idly rotating ring gear R, and properly convert the rotational motive power to electric power.

As is clear from the above, when switching between regeneration by the rear motor 3 using the rotational motive power from the rear wheels WRL and WRR, and driving of the rear wheels WRL and WRR by powering of the rear motor 3, differently from the above-described conventional power plant, the control device is not required to switch between braking by the hydraulic brake and release of the braking. Further, the connection/blocking of the transmission of the rotational motive power between the inner 4a and the outer 4b of the first one-way clutch 4 as well as the prevention of the reverse rotation of the ring gear R by the second one-way clutch 5 and the allowance of the normal rotation of the ring gear R are automatically performed with a change in the operation of the rear motor 3, and hence if is possible to improve the responsiveness of the switching. Furthermore, an actuator for actuating the conventional hydraulic brake can be dispensed with, and hence it is possible to reduce the weight and manufacturing costs of the entire power plant 1, accordingly. Further, differently from the conventional power plant, since it is possible to prevent occurrence of large dragging losses of the hydraulic brake, the efficiency of the vehicle V can be enhanced.

Furthermore, since the planetary gear unit PS of the existing single pinion type is used, it is possible to further reduce the manufacturing costs of the power plant 1. Further, since the sun gear S is connected to the rear motor 3, and the carrier C is connected to the rear wheels WRL and WRR, respectively, it is possible to transmit the rotational motive power from the rear motor 3 to the rear wheels WRL and WRR via the planetary gear unit PS in a state largely reduced in speed, whereby it is possible to employ a rotating electric machine of which the output torque is relatively small and which is small-sized, as the rear motor 3.

Further, the first and second one-way clutches 4 and 5 are arranged such that they overlap each other in the direction orthogonal to the rotational axis of the sun gear S, the carrier C, and the ring gear P (the radial direction of the planetary gear unit PS), and hence compared with a case where the first and second one-way clutches 4 and 5 are arranged such that they overlap each other in a direction of extension of the rotational axis (axial direction), it is possible to downsize the entire power plant 1 in the axial direction.

Figure 8:
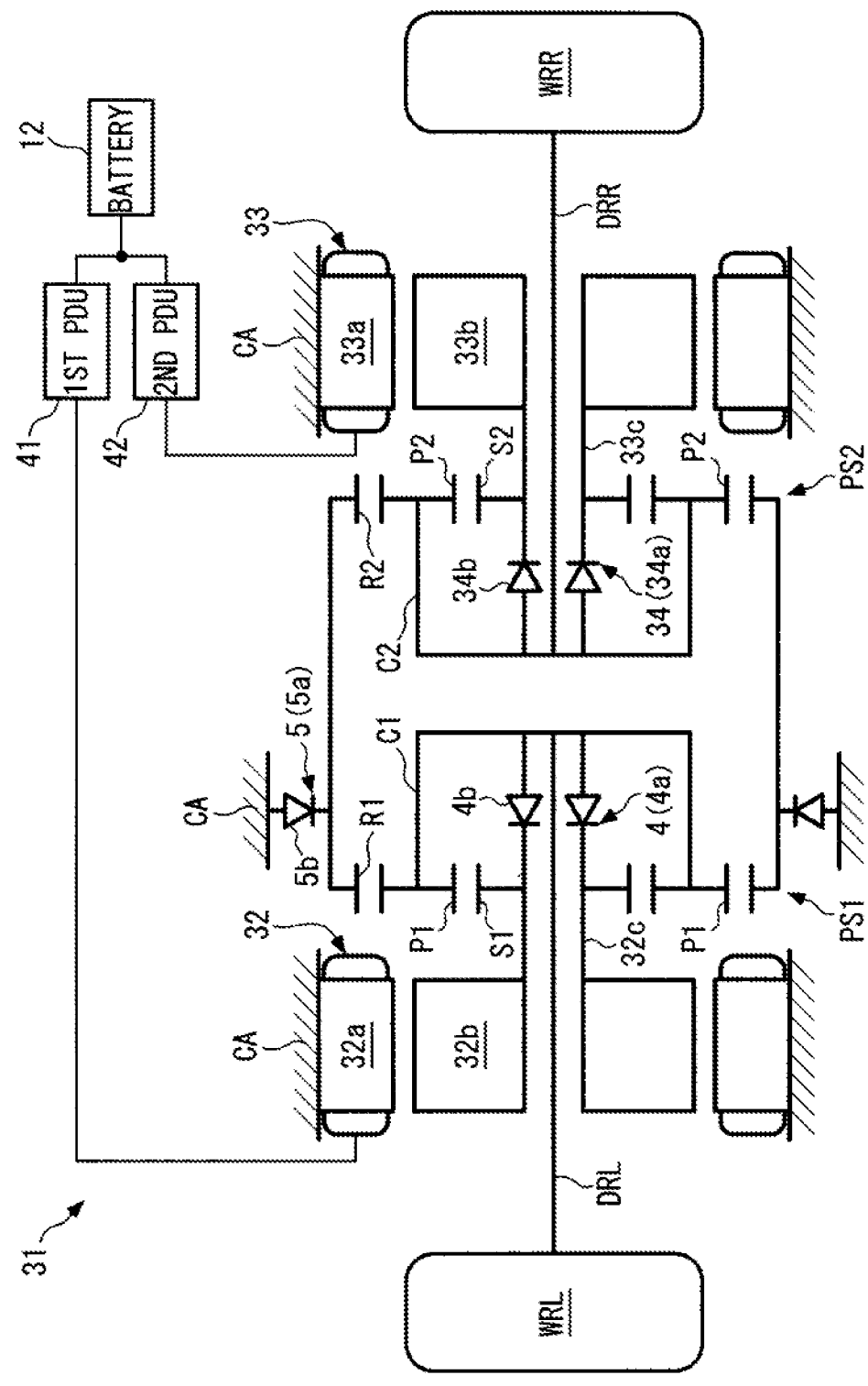
FIG. 8 A skeleton diagram showing a power plant according to a second embodiment of the present invention together with left and right rear wheels of a vehicle to which the power plant is applied.

Next, a power plant 31 according to a second embodiment of the present invention will be described with reference to FIGS. 8 to 14. Compared with the first embodiment, this power plant 31 is mainly different in that it includes a first rear motor 32 and a second rear motor 33 as well as a first planetary gear unit PS1 and a second planetary gear unit PS2 in place of the rear motor 3 and the planetary gear unit PS. In FIG. 8, the same component elements as those of the first embodiment are denoted by the same reference numerals. The following description is given mainly of different points from the first embodiment.

The above-mentioned first rear motor 32, first-planetary gear unit PS1, second planetary gear unit PS, and second rear motor 33 are arranged between the left and right rear wheels WRL and WRR from the left side in the mentioned order, and are disposed coaxially with each other. Further, similar to the rear motor 3, the first rear motor 32 is e.g. an AC motor, includes a stator 32a and a rotor 32b, and is configured to be capable of performing powering and regeneration. Similar to the rear motor 3, the second rear motor 33 as well is e.g. an AC motor, includes a stator 33a and a rotor 33b, and is configured to be capable of performing powering and regeneration. The stators 32a and 33a are fixed to the casing CA, and the rotors 32b and 33b are each formed into a hollow cylindrical shape.

Further, the normal rotational direction of the rotors 32b and 33b of the first and second rear motors 32 and 33 is set to the same direction as the normal rotational direction of the left and right rear wheels WRL and WRR. The rotor 32b is integrally formed with a hollow cylindrical rotating shaft 32c, and the rotating shaft 32c extends rightward from the rotor 32b. The left rear drive shaft DRL is relatively rotatably fitted inside the rotor 32b and the rotating shaft 32c. Further, the rotor 33b is integrally formed with a hollow cylindrical rotating shaft 33c, and the rotating shaft 33c extends leftward from the rotor 33b. The right rear drive shaft DRR is relatively rotatably fitted inside the rotor 33b and the rotating shaft 33c.

Figure 9:
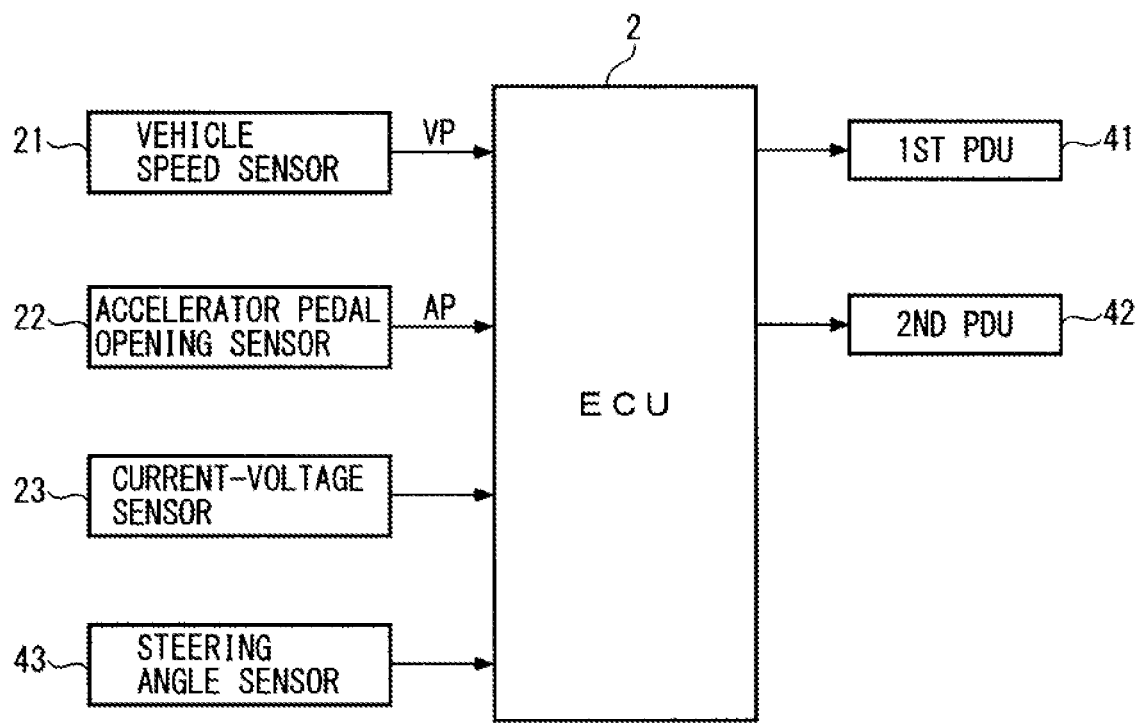

Further, the stators 32a and 33a of the first and second rear motors 32 and 33 are electrically connected to the battery 12 via a first PDU 41 and a second PDU 42, and are capable of supplying and receiving electric energy to and from the battery 12. Similar to the PDU 11, the first and second PDUs 41 and 42 are each formed by an electric circuit comprised e.g. of an inverter. As shown in FIG. 9, the ECU 2 is electrically connected to the two 41 and 42. The ECU 2 controls the first PDU 41 to thereby control electric power input to the stator 32a, electric power generated by the stator 32a, and the rotational speed of the rotor 32b, respectively. Further, the ECU 2 controls the second PDU 42 to thereby control electric power input to the stator 33a, electric power generated by the stator 33a, and the rotational speed of the rotor 33b, respectively.

Similar to the planetary gear unit PS, the first and second planetary gear units PS1 and PS2 are of a general single pinion type. The first planetary gear unit PS1 includes a first sun gear S1, a first ring gear R1 disposed around an outer periphery of the first sun gear S1, a plurality of first pinion gears P1 in mesh with the two gears S1 and R1, and a rotatable first carrier C1 rotatably supporting the first pinion gears P1. The first sun gear S1, the first carrier C1, and the first ring gear R1 are rotatable with respect to each other about the same rotational axis. The first sun gear S1 is coaxially and integrally formed with the rotating shaft 32c of the first rear motor 32, and is rotatable in unison with the rotating shaft 32c and the rotor 32b. Further, the first carrier C1 integrally includes support shafts rotatably supporting the first pinion gears P1, and a disk-shaped flange to which the support shafts are fixed, and extends rightward from the first pinion gears P1. This flange is coaxially attached to the right end of the left rear drive shaft DRL, and the first carrier C1 is rotatable in unison with the left rear drive shaft DRL and the left rear wheel WRL.

Similar to the planetary gear unit PS, the above-mentioned second planetary gear unit PS2 is of a general single pinion type, and includes a second sun gear S2, a second ring gear R2 disposed around an outer periphery of the second sun gear S2, a plurality of second pinion gears P2 in mesh with the two gears S2 and R2, and a rotatable second carrier C2 rotatably supporting the second pinion gears P2. The second sun gear S2, the second carrier C2, and the second ring gear R2 are rotatable with respect to each other about the same rotational axis. The second sun gear S2 is coaxially and integrally formed with the rotating shaft 33c of the second rear motor 33, and is rotatable in unison with the rotating shaft 33c and the rotor 33b. Further, the numbers of gear teeth of the first and second sun gears S1 and S2 are set to the same value, and the numbers of gear teeth of the first and second ring gears R1 and R2 are set to the same value.

With this, the speed reduction ratios of the first and second planetary gear units PS1 and PS2 are equal to each other.

Furthermore, the second carrier C2 integrally includes support shafts rotatably supporting the second pinion gears P2, and a disk-shaped flange to which the support shafts are fixed, and extends leftward from the second pinion gears P2. This flange is coaxially attached to the left end of the right rear drive shaft DRR, and the second carrier C2 is rotatable in unison with the right rear drive shaft DRR and the right rear wheel WRR.

As described above, in the power plant 31, the rotational axis of the first sun gear S1, the first carrier C1, and the first ring gear R1, and the rotational axis of the second sun gear S2, the second carrier C2, and the second ring gear R2 are coincident with each other. Further, the first and second sun gears S1 and S2 are mechanically connected to the first and second rear motors 32 and 33, respectively, and the first and second carriers C1 and C2 are mechanically connected to the left and right rear wheels WRL and WRR, respectively.

Further, the inner 4a of the first one-way clutch 4 is coaxially attached to the first sun gear S1, and is rotatable in unison with the first sun gear S1. The outer 4b is coaxially attached to the first carrier C1, and is rotatable in unison with the first carrier C1. The left rear drive shaft DRL is relatively rotatably fitted inside the inner 4a and the outer 4b.

With the construction described above, in the first one-way clutch 4, in a case where the first sun gear S1 and the first carrier C1 are performing normal rotation by transmission of rotational motive power from the first rear motor 32, when the rotational speed of the first sun gear S1 becomes higher than the rotational speed of the first carrier C1, the rollers are moved to their above-mentioned retracted positions by being pressed via their surfaces in contact with the other of the inner 4a and the outer 4b, causing release of the engagement thereof with the two 4a and 4b. As a consequence, transmission of rotational motive power from the inner 4a to the outer 4b is blocked. Further, in a case where powering of the first rear motor 32 is stopped, and the first carrier C1 and the first sun gear S1 are performing normal rotation by transmission of rotational motive power from the left rear wheel WRL, when the rotational speed of the first sun gear S1 becomes not higher than the rotational speed of the first carrier C1, the rollers are moved to their above-mentioned engaged positions by being pressed via their surfaces in contact with the other of the inner 4a and the outer 4b, causing engagement thereof with the two 4a and 4b. As a consequence, transmission of rotational motive power from the outer 4b to the inner 4a is connected.

Further, the inner 5a of the second one-way clutch 5 is coaxially and integrally formed with a hollow cylindrical rotating shaft. This rotating shaft is coaxially attached to the first and second ring gears R1 and R2. With this, the first and second ring gears R1 and R2, and the inner 5a are capable of normal rotation in unison with each other. The first and second carriers C1 and C2 are rotatably provided inside the inner 5a and the hollow cylindrical rotating shaft. Further, the second one-way clutch 5 is arranged such that it overlaps the first one-way clutch 4 in a radial direction of the first planetary gear unit PS1, i.e. in a direction orthogonal to the rotational axis of the first sun gear S1, the first carrier C1, and the first ring gear R1.

With the construction described above, in the second one-way clutch 5, when a torque that causes normal rotation is transmitted to the first and second ring gears R1 and R2, the rollers are moved to their above-mentioned retracted positions by being pressed via their surfaces in contact with one of the inner 5a and the outer 5b, causing release of the engagement thereof with the two 5a and 5b. As a consequence, the normal rotations of the first and second ring gears R1 and R2 are allowed. Further, when a torque that causes reverse rotation is transmitted to the first and second ring gears R1 and R2, the rollers are moved to their above-mentioned engaged positions by being pressed via their surfaces in contact with the one of the inner 5a and the outer 5b, causing engagement thereof with the two 5a and 5b. As a consequence, the reverse rotations of the first and second ring gears R1 and R2 are prevented.

Further, the power plant 31 further includes a third one-way clutch 34. The third one-way clutch 34 is constructed similar to the first one-way clutch 4, and includes an inner 34a and an outer 34b, which are annular, and a plurality of rollers and springs (none of which are shown). Each roller is disposed between the two 34a and 34b in a state accommodated in a recess formed in one of the inner 34a and the outer 34b. The roller is urged by an associated one of the above-mentioned springs, and is movable between an engaged position where the roller is engaged with the inner 34a and the outer 34b, and a retracted position where the engagement with the two 34a and 34b is released. Further, the inner 34a is coaxially attached to the second sun gear S2, and is rotatable in unison with the second sun gear S2. The outer 34b is coaxially attached to the second carrier C2, and is rotatable in unison with the second carrier C2. The right rear drive shaft DRR is relatively rotatably fitted inside the inner 34a and the outer 34b.

In the third one-way clutch 34 constructed as above, in a case where the second sun gear S2 and the second carrier C2 are performing normal rotation by transmission of rotational motive power from the second rear motor 33, when the rotational speed of the second sun gear S2 becomes higher than the rotational speed of the second carrier C2, the rollers are moved to their above-mentioned retracted positions by being pressed via their surfaces in contact with the other of the inner 34a and the outer 34b, causing release of the engagement thereof with the two 34a and 34b. As a consequence, transmission of rotational motive power from the inner 34a to the outer 34b is blocked. Further, in a case where powering of the second rear motor 33 is stopped, and the second carrier C2 and the second sun gear S2 are performing normal rotation by transmission of rotational motive power from the right rear wheel WRR, when the rotational speed of the second sun gear S2 becomes not higher than the rotational speed of the second carrier C2, the rollers are moved to their above-mentioned engaged positions by being pressed via their surfaces in contact with the other of the inner 34a and the outer 34b, causing engagement thereof with the two 34a and 34b. As a consequence, transmission of rotational motive power from the outer 34b to the inner 34a is connected.

Further, as shown in FIG. 9, to the ECU 2, a detection signal indicative of a steering angle of a steering wheel of the vehicle V is input from a steering angle sensor 43.

The ECU 2 selects one of travel modes of the vehicle V based on the detection signals from the aforementioned sensors 21 to 23 and 43, according to control programs stored in the ROM, and controls the operations and the like of the engine ENG, the front motor FrM, and the first and second rear motors 32 and 33, based on the selected travel mode. As the travel modes, similar to the first embodiment, the EV standing start mode, the ENG travel mode, the EV cruise mode, the power acceleration mode, the ENG cruise mode, the decelerating regeneration mode, and the 4 WD travel mode are provided.

Next, the operations of the power plant 31 in the above-described travel modes will be described with reference to FIGS. 10 to 12. As is widely known, in the first planetary gear unit PS1 of the single pinion type, the first sun gear S1, the first carrier C1, and the first ring gear R1 are capable of transmitting rotational motive power therebetween, and the rotational speeds of the three S1, C1, and R1 are in a collinear relationship in which they are aligned in a single straight line in the mentioned order in a collinear chart indicating the relationship between the rotational speeds. Further, as is clear from the above-described connection relationship between the various types of rotary elements, the rotational speed of the first sun gear S1 is equal to the rotational speed of the first rear motor 32, and the rotational speed of the first carrier C1 is equal to the rotational speed of the left rear wheel WRL. Furthermore, the inner 4a and the outer 4b of the first one-way clutch 4 are attached to the first sun gear S1 and the first carrier C1, respectively, and the inner 5a of the second one-way clutch 5 is attached to the first ring gear R1.

Further, in the second planetary gear unit PS2, similar to the first planetary gear unit PS1, the second sun gear S2, the second carrier C2, and the second ring gear R2 are capable of transmitting rotational motive power therebetween, and the rotational speeds of the three S2, C2, and R2 are in a collinear relationship in which they are aligned in a single straight line in the mentioned order in a collinear chart indicating the relationship between the rotational speeds. Further, as is clear from the above-described connection relationship between the various types of rotary elements, the rotational speed of the second sun gear S2 is equal to the rotational speed of the second rear motor 33, and the rotational speed of the second carrier C2 is equal to the rotational speed of the right rear wheel WRR. Furthermore, the inner 34a and the outer 34b of the third one-way clutch 34 are attached to the second sun gear S2 and the second carrier C2, respectively, and the inner 5a of the second one-way clutch 5 is attached to the second ring gear R2. From the above, the relationship between the rotational speeds of the various rotary elements of the power plant 31 is expressed e.g. in collinear charts shown in FIGS. 10 to 12.

Figure 10:
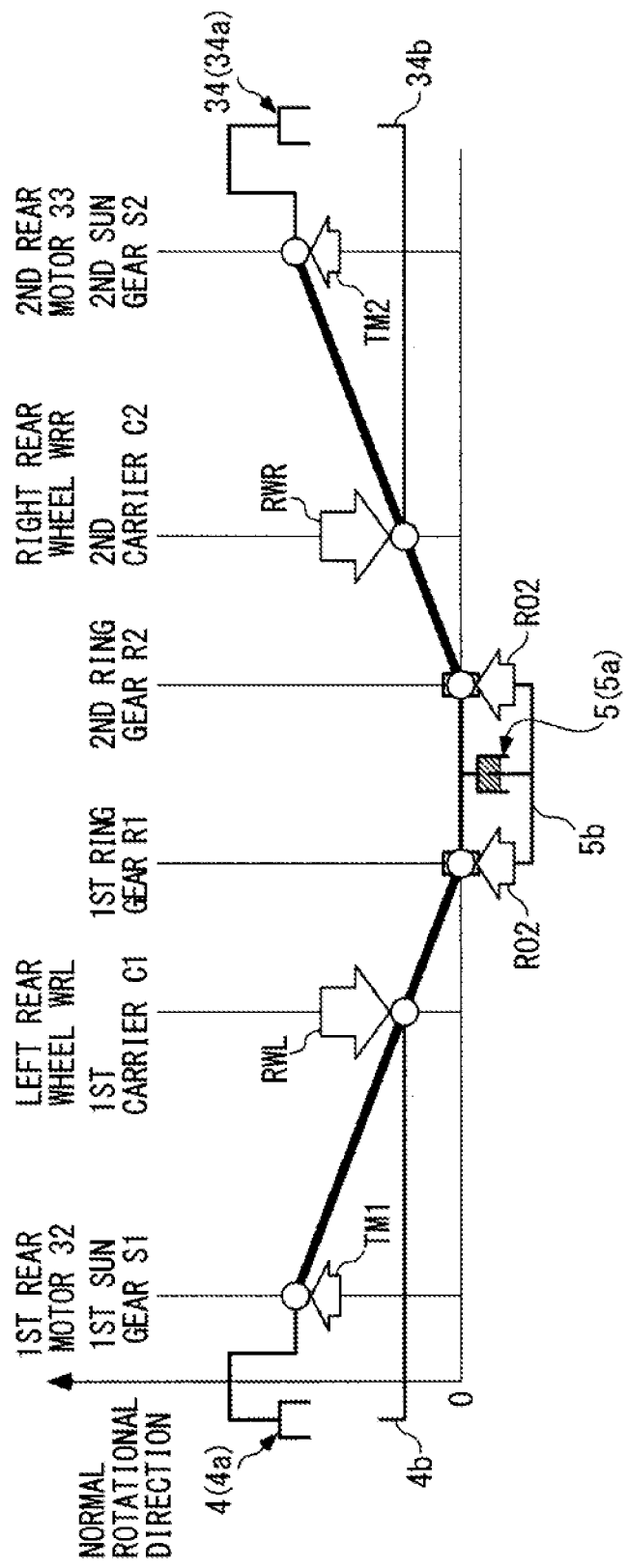
FIG. 10 A collinear chart showing a rotational speed relationship and a torque balance relationship between various types of rotary elements of the power plant shown in FIG. 8, during travel modes for causing the vehicle to travel forward using the first and second rear motors as motive power sources.

FIG. 10 shows an example of a rotational speed relationship and a torque balance relationship between the various types of rotary elements in the travel modes which use the first and second rear motors 32 and 33 as motive power sources, i.e. the EV standing start mode, the EV cruise mode, the power acceleration mode, and the 4 WD travel mode. In these travel modes, powering of the first and second rear motors 32 and 33 is performed, and the directions of rotations of the rotors 32b and 33b of the first and second rear motors 32 and 33 are controlled to the normal rotational direction. Also, electric power input to the first and second rear motors 32 and 33 is controlled such that the torques of the two 32 and 33 become equal to each other.

In FIG. 10, TM1 and TM2 represent the torques of the first and second rear motors 32 and 33, generated by the powering of the first and second rear motors 32 and 33 (hereinafter respectively referred to as the "first rear motor powering torque" and the "second rear motor powering torque"), respectively, and RWL and RWR represent reaction force torques of the left and right rear wheels WRL and WRR acting on the first and second carriers C1 and C2, respectively. Further, as mentioned above, RO2 represents the reaction force torque of the second one-way clutch 5.

As shown in FIG. 10, the first rear motor powering torque TM1 acts to cause the first sun gear S1 and the first carrier C1 to perform normal rotation, and acts to cause the first ring gear R1 to perform reverse rotation. Further, the second rear motor powering torque TM2 acts to cause the second sun gear S2 and the second carrier C2 to perform normal rotation, and acts to cause the second, ring gear R2 to perform reverse rotation. As described hereinabove, the reverse rotations of the first and second ring gears R1 and R2 are prevented by the second one-way clutch 5. For this reason, the first rear motor powering torque TM1 transmitted to the first sun gear S1 is transmitted to the first carrier C1 using the reaction force torque RO2 of the second one-way clutch 5 acting on the first ring gear R1 as a reaction force, and is further transmitted to the left rear wheel WRL. Further, the second rear motor powering torque TM2 transmitted to the second sun gear S2 is transmitted to the second carrier C2 using the reaction force torque RO2 of the second one-way clutch 5 acting on the second ring gear R2 as a reaction force, and is further transmitted to the right rear wheel WRR.

In this case, the first sun gear S1 and the first carrier C1 perform normal rotation, and the rotational speed of the first sun gear S1 performing normal rotation becomes higher than the rotational speed of the first carrier C1, and hence the transmission of the rotational motive power from the inner 4a to the outer 4b of the first one-way clutch 4 is blocked. Further, the second sun gear S2 and the second carrier C2 perform normal rotation, and the rotational speed of the second sun gear S2 performing normal rotation becomes higher than the rotational speed of the second carrier C2, and hence the transmission of the rotational motive power from the inner 34a to the outer 34b of the third one-way clutch 34 is blocked.

Note that in FIG. 10, the blocking of the transmission of the rotational motive power from the inner 4a to the outer 4b of the first one-way clutch 4 is represented by drawing the two 4a and 4b apart from each other, and the blocking of the transmission of the rotational motive power from the inner 34a to the outer 34b of the third one-way clutch 34 is represented by drawing the two 34a and 34b apart from each other. Further, the engagement of the inner 5a and the outer 5b of the second one-way clutch 5 with each other via the rollers is represented by drawing the two 5a and 5b such that the two 5a and 5b partially overlap each other, and hatching overlapping portions of them.

As is apparent from FIG. 10, in the travel modes which use the first and second rear motors 32 and 33 as motive power sources, the rotational motive power from the first rear motor 32 is transmitted to the left rear wheel WRL in a state reduced in speed at a speed reduction ratio of the first planetary gear unit PS1, defined by the numbers of gear teeth of the first sun gear S1 and the first ring gear R1, and the rotational motive power from the second rear motor 33 is transmitted to the right rear wheel WRR in a state reduced in speed at a speed reduction ratio of the second planetary gear unit PS2, defined by the numbers of gear teeth of the second sun gear S2 and the second ring gear R2.

Figure 11:
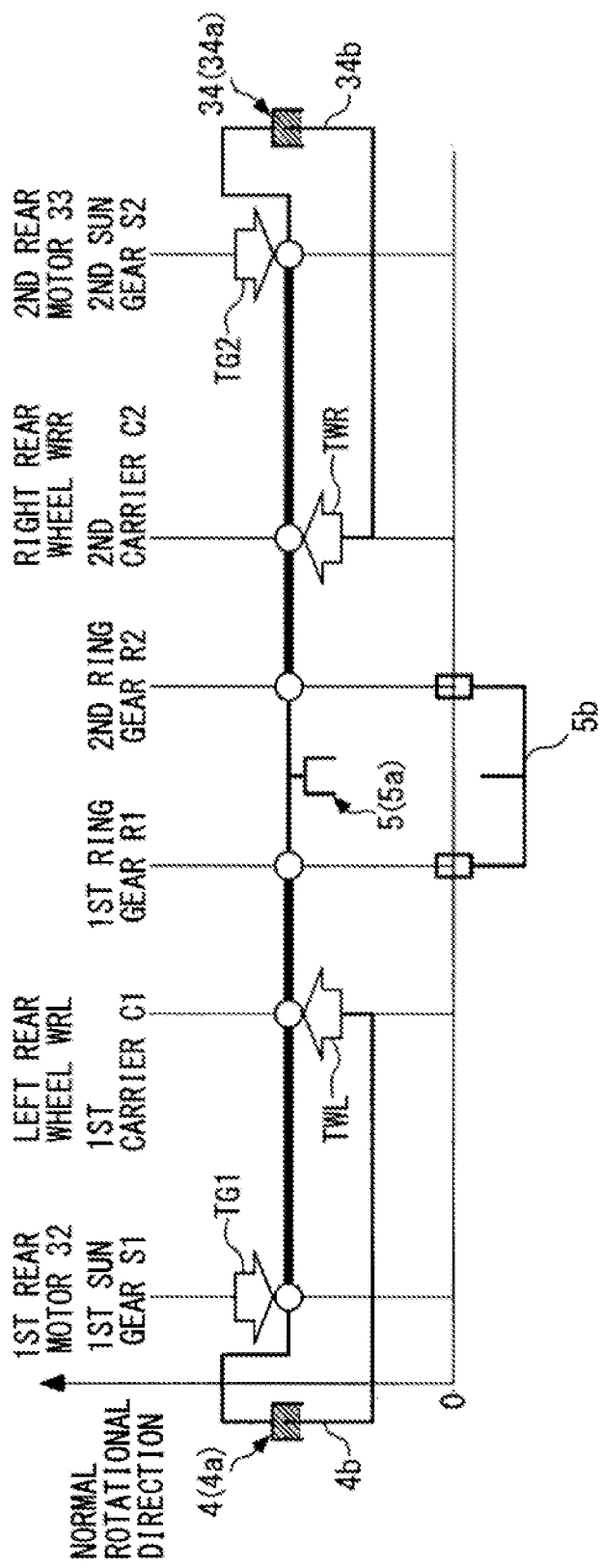
FIG. 11 A collinear chart showing a rotational speed relationship and a torque balance relationship between the various types of rotary elements of the power plant shown in FIG. 8, during the decelerating regeneration mode.

Further, FIG. 11 shows an example of a rotational speed relationship and a torque balance relationship between the various types of rotary elements in the decelerating regeneration mode. In the decelerating regeneration mode, regeneration is performed by the first rear motor 32 using the rotational motive power from the left rear wheel WRL, and regeneration is performed by the second rear motor 33 using the rotational motive power from the right rear wheel WRR. Also, electric power generated by the first and second rear motors 32 and 33 is charged into the battery 12. Further, the electric power generated by the first and second rear motors 32 and 33 is controlled such that braking torques of the first and second rear motors 32 and 33 generated by the regeneration become equal to each other. In FIG. 11, TG1 and TG2 represent respective braking torques of the first and second rear motors 32 and 33 generated by regeneration (hereinafter respectively referred to as the "first rear motor braking torque" and the "second rear motor braking torque"). Further, TWL and TWR represent torques transmitted from the left and right rear wheels WRL and WRR to the first and second carriers C1 and C2, respectively.

As shown in FIG. 11, the torque TWL transmitted from the left rear wheel WRL to the first carrier C1 acts to cause the first sun gear S1 and the first ring gear R1 to perform normal rotation, and the torque TWR transmitted from the right rear wheel WRR to the second carrier C2 acts to cause the second sun gear S2 and the second ring gear R2 to perform normal rotation. As described hereinabove, the second one-way clutch 5 allows the normal rotations of the first and second ring gears R1 and R2. Therefore, in this case, the braking force of the second one-way clutch 5 does not act on the first and second ring gears R1 and R2, whereby the two gears R1 and R2 idly rotate in the normal rotational direction.

Further, the first sun gear S1 and the first carrier C1 perform normal rotation, and the first rear motor braking torque TG1 acts to lower the rotational speed of the first sun gear S1 with respect to the rotational speed of the first carrier C1, whereby the transmission of the rotational motive power from the outer 4b to the inner 4a of the first one-way clutch 4 is connected, which causes the first sun gear S1, the first carrier C1, and the first ring gear R1 to rotate in unison with each other. Further, the second sun gear S2 and the second carrier C2 perform normal rotation, and the second rear motor braking torque TG2 acts to lower the rotational speed of the second sun gear 32 with respect to the rotational speed of the second carrier C2, whereby the transmission of the rotational motive power from the outer 34b to the inner 34a of the third one-way clutch 34 is connected, which causes the second sun gear S2, the second carrier C2, and the second ring gear R2 to rotate in unison with each other.

As a consequence, during the decelerating regeneration mode, rotational motive power transmitted from the left and right rear wheels WRL and WRR to the first and second carriers C1 and C2, respectively, is transmitted to the first and second rear motors 32 and 33 via the first and second sun gears S1 and S2, respectively, without all being transmitted to the idly rotating first and second ring gears R1 and R2, and are converted to electric power by regeneration by the first and second rear motors 32 and 33.

Note that in FIG. 11, the connection of the transmission of the rotational motive power from the outer 4b to the inner 4a of the first one-way clutch 4 is represented by drawing the two 4b and 4a such that the two 4b and 4a partially overlap each other, and hatching overlapping portions of them, and the connection of the transmission of the rotational motive power from the outer 34b to the inner 34a of the third one way clutch 34 is represented by drawing the two 34b and 34a such that the two 34b and 34a partially overlap each other, and hatching overlapping portions of them. Further, the release of the engagement between the inner 5a and the outer 5b of the second one-way clutch 5 is represented by drawing the two 5a and 5b apart from each other. The same applies to FIG. 12.

Figure 12:
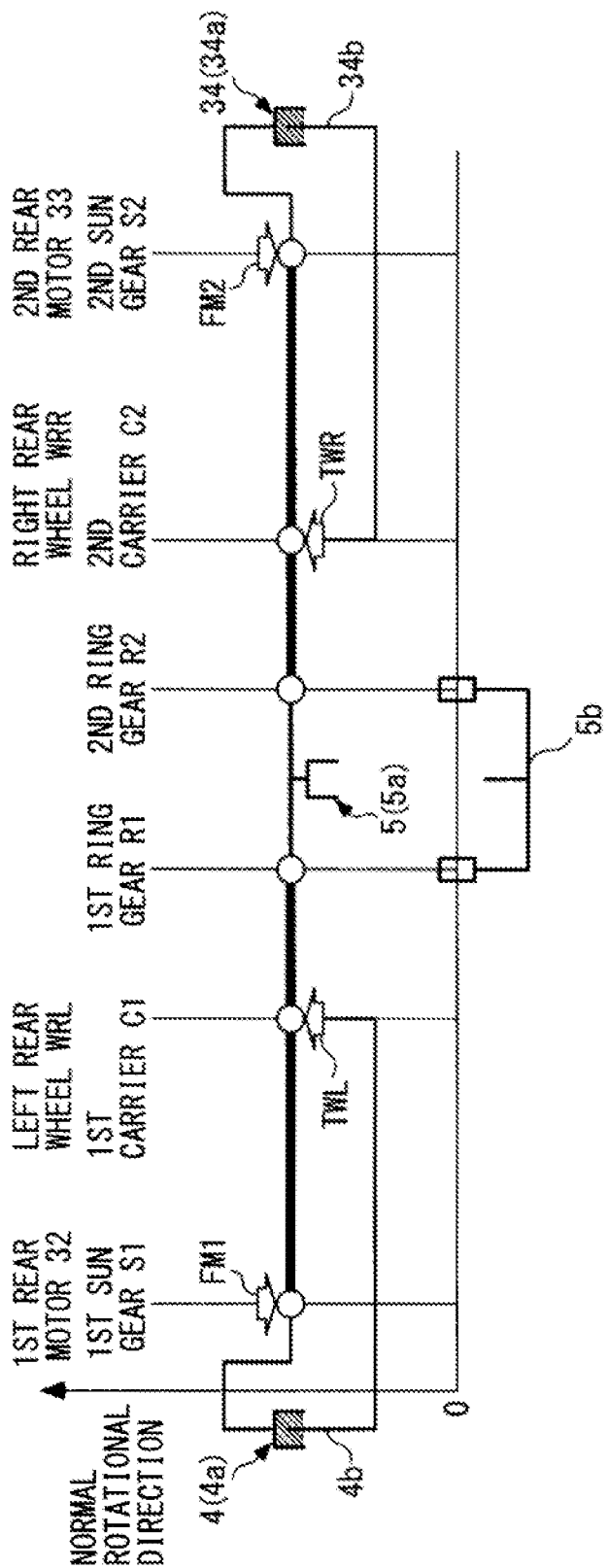
FIG. 12 A collinear chart showing a rotational speed relationship and a torque balance relationship between the various types of rotary elements of the power plant shown in FIG. 8, during travel modes for causing the vehicle to travel forward using a motive power source other than the first and second rear motors.

Further, FIG. 12 shows an example of a rotational speed relationship and a torque balance relationship between the various types of rotary elements in travel modes which do not use the first and second rear motors 32 and 33 as motive power sources, i.e. the ENG travel mode and the ENG cruise mode. In this case, the first and second PDUs 41 and 42 are controlled such that no electric current flows through the stators 32a and 33a of the first and second rear motors 32 and 33. In FIG. 12, FM1 and FM2 represent respective frictions of the first and second rear motors 32 and 33 (cogging torques, hereinafter referred to as the "first rear motor friction" and the "second rear motor friction", respectively). TWL and TWR represent the torques transmitted from the left and right rear wheels WRL and WRR to the first and second carriers C1 and C2, respectively, as described hereinabove.

During the ENG travel mode and during the ENG cruise mode, similar to the case described with reference to FIG. 11, the respective torques TWL and TWR transmitted from the left and right rear wheels WRL and WRR to the first and second carriers C1 and C2, respectively, act to cause the first sun gear S1 and the first ring gear R1 as well as the second sun gear S2 and the second ring gear R2 to perform normal rotation, whereby the first and second ring gears R1 and R2 perform normal rotation. Further, similar to the first rear motor braking torque TG1, the first rear motor friction FM1 acts to lower the rotational speed of the first sun gear S1 with respect to the rotational speed of the first carrier C1. Further, similar to the second rear motor braking torque TG2, the second rear motor friction FM2 acts to lower the rotational speed of the second sun gear S2 with respect to the rotational speed of the second carrier C2.

From the above, in this case as well, similar to the case of the decelerating regeneration mode, the second one-way clutch 5 allows the normal rotations of the first and second ring gears R1 and R2. Further, the transmission of the rotational motive power from the outer 4b to the inner 4a of the first one-way clutch 4 is connected, whereby the first sun gear S1, the first carrier C1, and the first ring gear R1 are caused to rotate in unison with each other, and the transmission of the rotational motive power from the outer 34b to the inner 34a of the third one-way clutch 34 is connected, whereby the second sun gear S2, the second carrier C2, and the second ring gear R2 are caused to rotate in unison with each other. Therefore, similar to the case of the first embodiment, it is possible to reduce the first and second rear motor frictions FM1 and FM2 acting on the respective left and right rear wheels WRL and WRR, which in turn makes it possible to enhance the efficiency of the vehicle V.

Further, in the power plant 31, as travel modes of the vehicle V, a first turning mode and a second turning mode, which are selected during turning of the vehicle V when the vehicle V is traveling forward, are further provided in addition to the above-described travel modes. The outline of the first and second turning modes is as follows:

First turning mode: A travel mode in which during turning of the vehicle V traveling forward, when a detected steering angle is relatively large (steering angle>predetermined value), a relatively large torque difference is generated between the left and right rear wheels WRL and WRR by largely increasing the torque of the outer turning one of the two WRL and WRR with respect to the torque of the inner turning one of the same.

Second turning mode: A travel mode in which during turning of the vehicle V traveling forward, when a detected steering angle is relatively small (steering angle≤predetermined value mentioned above), a relatively small torque difference is generated between the left and right rear wheels WRL and WRR by slightly increasing the torque of the outer turning one of the two WRL and WRR with respect to the torque of the inner turning one of the same.

Figure 13:
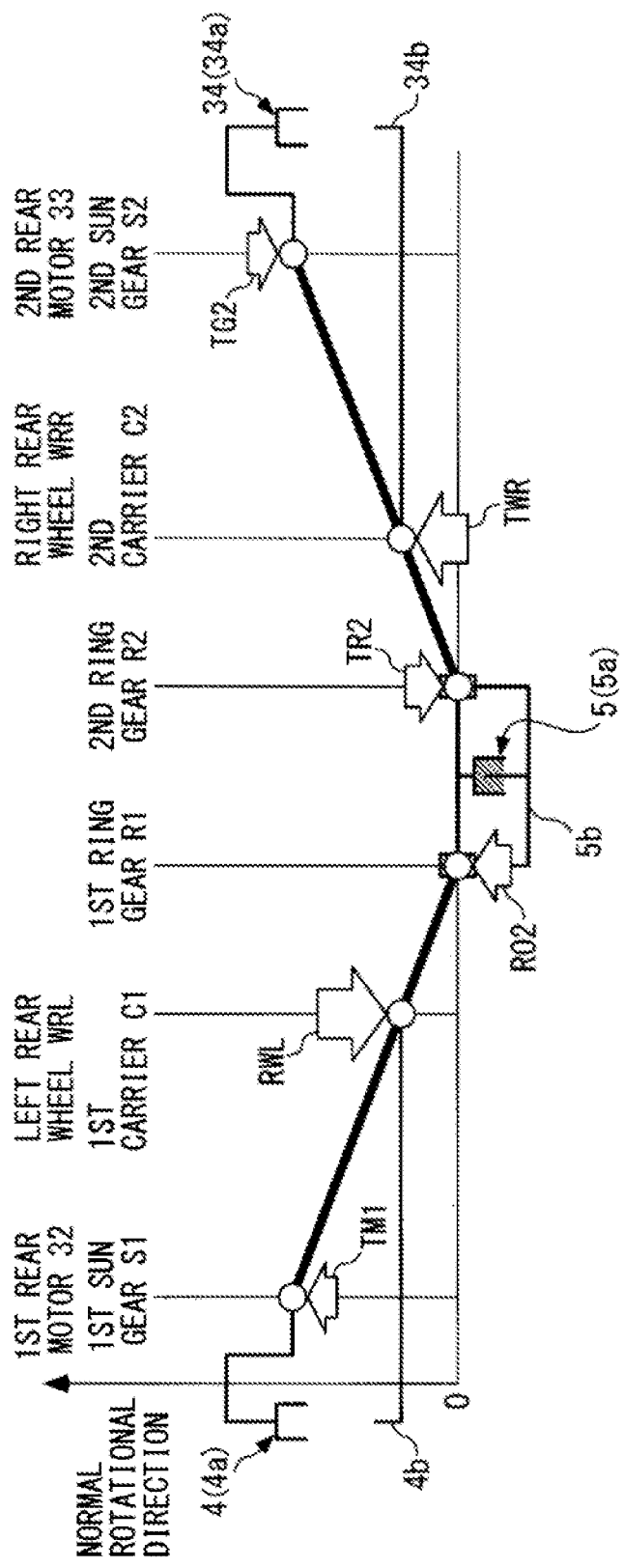
FIG. 13 A collinear chart showing a rotational speed relationship and a torque balance relationship between the various types of rotary elements of the power plant shown in FIG. 8, during a first turning mode.

FIG. 13 shows an example of a rotational speed relationship and a torque balance relationship between the various types of rotary elements in the first turning mode during right turning of the vehicle V. In this case, powering is performed by the first rear motor 32 connected to the left rear wheel WRL, which is an outer turning wheel, and electric power input to the first rear motor 32 is controlled to a relatively large value. Further, regeneration is performed by the second rear motor 33 using rotational motive power transmitted from the right rear wheel WFR, which is an inner turning wheel, to the second rear motor 33 via the second carrier C2 and the second sun gear S2, and electric power generated by the second rear motor 33 is controlled to a relatively small value. In this case, electric power from the battery 12 is input to the first rear motor 32 in addition to electric power regenerated by the second rear motor 33, so that the electric power input to the first rear motor 32 becomes considerably larger than the electric power generated by the second rear motor 33. In FIG. 13, TR2 represents a torque transmitted from the first rear motor 32 to the second ring gear R2 via the first planetary gear unit PS1. The other parameters are as described above.

As shown in FIG. 13, similar to the case of FIG. 10, the first rear motor powering torque TM1 acts to cause the first sun gear 31 and the first carrier C1 to perform normal rotation, and acts to cause the first ring gear R1 to perform reverse rotation together with the second ring gear R2. Further, a torque from the right rear wheel WRR acts to cause the second ring gear R2 to perform normal rotation together with the first ring gear R1 using the second rear motor braking torque TG2 acting on the second sun gear 32 as a reaction force. Furthermore, the absolute value of the first rear motor powering torque TM1 becomes considerably larger than the absolute value of the second rear motor braking torque TG2 through the above-described control of the input electric power and the generated electric power at the first and second rear motors 32 and 33, whereby a torque in the reverse rotational direction, which acts on the first and second ring gears R1 and R2 from the first rear motor 32, becomes larger than a torque in the normal rotational direction, which acts on the first and second ring gears R1 and R2 from the right rear wheel WRR. With this, the first and second ring gears R1 and R2 are braked and stopped by the second one-way clutch 5.

From the above, in this case, the rotational motive power from the first rear motor 32 is transmitted to the left rear wheel WRL in a state reduced in speed by the first planetary gear unit PS1, and the rotational motive power from the right rear wheel WRR is transmitted to the second rear motor 33 in a state increased in speed by the second planetary gear unit PS2, and is converted to electric power. In this case, as described above, since the absolute value of the first rear motor powering torque TM1 is considerably larger than the absolute value of the second rear motor braking torque TG2, and the difference therebetween is relatively large, the torque of the left rear wheel WRL is relatively largely increased with respect to the torque of the right rear wheel WRR. As a consequence, a relatively large torque difference is generated between the two WRL and WRR.

Note that in the first turning mode during left turning of the vehicle V, the control performed on the first and second rear motors 32 and 33 in the above-described first turning mode during right turning of the vehicle V is performed on the second and first, rear motors 33 and 32, respectively. That is, in the first turning mode during the left turning, powering is performed by the second rear motor 33 connected to the right rear wheel WRL, which is an outer turning wheel, and electric power input to the second rear motor 33 is controlled to a relatively large value. Further, regeneration is performed by the first rear motor 32 using rotational motive power transmitted from the left rear wheel WRL, which is an inner turning wheel, to the first rear motor 32 via the first carrier C1 and the first sun gear S1, and electric power generated by the first rear motor 32 is controlled to a relatively small value. In this case, electric power from the battery 12 is input to the second rear motor 33 in addition to electric power regenerated by the first rear motor 32, so that the electric power input to the second rear motor 33 becomes considerably larger than the electric power generated by the first rear motor 32.

From the above, in the first turning mode during the left turning, an operation is performed which is left-right reversed to, the operation in the first turning mode during the right turning, described above with reference to FIG. 13. As a consequence, the torque of the right rear wheel WRR is relatively largely increased with respect to the torque of the left rear wheel WRL, whereby a relatively large torque difference occurs between the two WRR and WRL.

Figure 14:
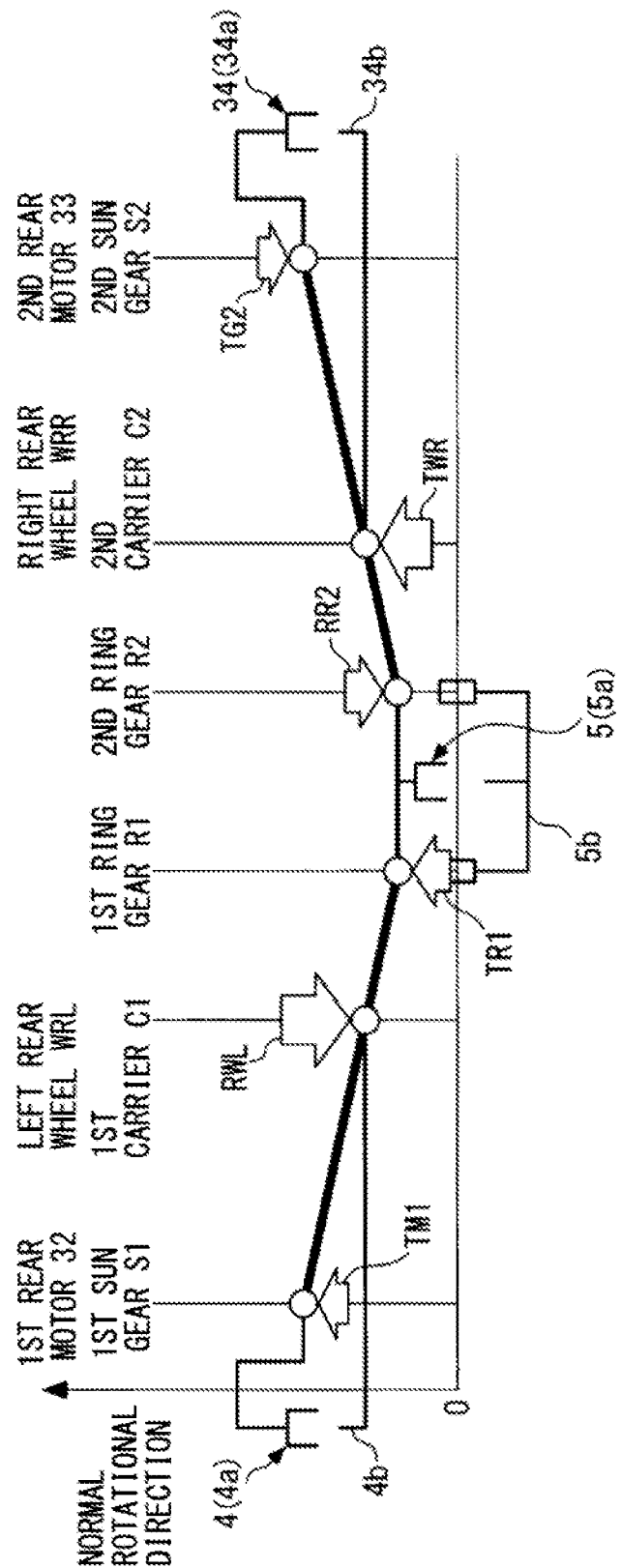
FIG. 14 A collinear chart showing a rotational speed relationship and a torque balance relationship between the various types of rotary elements of the power plant shown in FIG. 8, during a second turning mode.

Further, FIG. 14 shows a rotational speed relationship and a torque balance relationship between the various types of rotary elements in the second turning mode during right turning of the vehicle V. In this case, powering is performed by the first rear motor 32 connected to the left rear wheel WRL, which is an outer turning wheel, and the electric power input to the first rear motor 32 is controlled to a very small value. Further, regeneration is performed by the second rear motor 33 using the rotational motive power transmitted from the right rear wheel WRR, which is an inner turning wheel, to the second rear motor 33 via the second carrier C1 and the second sun gear S2, and the electric power generated by the second rear motor 33 is controlled to a relatively small value. In this case, most part of the electric power generated by the second rear motor 33 is input to the first rear motor 32, and the remainder is charged into the battery 12, so that the electric power generated by the second rear motor 33 is slightly larger than the electric power input to the first rear motor 32. In FIG. 14, RR2 represents a reaction force torque acting on the second ring gear R2 along with the regeneration by the second rear motor 33, and TR1 represents a torque transmitted from the right rear wheel WRR to the first ring gear R1 via the second planetary gear unit PS2 along with the regeneration by the second rear motor 33.

As shown in FIG. 14, similar to the case of FIG. 13, the first rear motor powering torque TM1 acts to cause the first sun gear S1 and the first carrier C1 to perform normal rotation, and acts to cause the first and second ring gears R1 and R2 to perform reverse rotation. The torque from the right rear wheel WRR acts to cause the second and first ring gears R2 and R1 to perform normal rotation using the second rear motor braking torque TG2 acting on the second sun gear S2 as a reaction force. Furthermore, the absolute value of the second rear motor braking torque TG2 becomes slightly larger than the absolute value of the first rear motor powering torque TM1 through the above-described control of the input electric power and the generated electric power at the first and second rear motors 32 and 33, and hence the torque in the normal rotational direction, which acts on the first and second ring gears R1 and R2 from the right rear wheel WRR, becomes larger than the torque in the reverse rotational direction, which acts on the first and second ring gears R1 and R2 from the first rear motor 32. As a consequence, the first and second ring gears R1 and R2 idly rotate in the normal rotational direction.

From the above, in this case, part of the rotational motive power from the right rear wheel WRR is distributed to the second rear motor 33 and the first ring gear R1 via the second planetary gear unit PS2. The rotational motive power distributed to the second rear motor 33 is converted to electric power, and the rotational motive power distributed to the first ring gear R1 is transmitted to the left rear wheel WRL together with the rotational motive power from the first rear motor 32. In this case, as described above, the absolute value of the second rear motor braking torque TG2 is slightly larger than the absolute, value of the first rear motor powering torque TM1, and the absolute values of the two are relatively small, so that the torque of the left rear wheel WRL is relatively slightly increased with respect to the torque of the right rear wheel WRR. As a consequence, a relatively small torque difference is generated between the two WRL and WRR.

Note that in the second turning mode during left turning of the vehicle V, the control performed on the first and second rear motors 32 and 33 in the above-described second turning mode during right turning of the vehicle V is performed on the second and first rear motors 33 and 32, respectively. That is, in the second turning mode during the left turning, powering is performed by the second rear motor 33 connected to the right rear wheel WRR, which is an outer turning wheel, and the electric power input to the second rear motor 33 is controlled to a very small value. Further, regeneration is performed by the first rear motor 32 using the rotational motive power transmitted from the left rear wheel WRL, which is an inner turning wheel, to the first rear motor 32 via the first carrier C1 and the first sun gear S1, and the electric power generated by the first rear motor 32 is controlled to a relatively small value. In this case, most of the electric power generated by the first rear motor 32 is input to the second rear motor 33, and the remainder is charged into the battery 12. The electric power generated by the first rear motor 32 is slightly larger than the electric power input to the second rear motor 33.

From the above, in the second turning mode during the left turning, an operation is performed which is left-right reversed to the operation in the second turning mode during the right turning, described above with reference to FIG. 14. As a consequence, the torque of the right rear wheel WRR is relatively slightly increased with respect to the torque of the left rear wheel WRL, whereby a relatively small torque difference is generated between the two WRR and WRL.

Although in the first and second turning modes, the torque of the outer turning wheel is increased with respect to the torque of the inner turning wheel, inverse to this, in order to suppress the oversteer of the vehicle V, the torque of the inner turning wheel may be increased with respect to the torque of the outer turning wheel. In this case, the above-described control operation on the first rear motor 32 is performed on the second rear motor 33, and the above-described control operation on the second rear motor 33 is performed on the first, rear motor 32.

Further, in the power plant 31, when the vehicle V is turning during forward travel, powering is performed by the first and second rear motors 32 and 33, and electric power input to one of the two motors 32 and 33, associated with the outer turning one of the left and right rear wheels WRL and WRR, is controlled to a larger value than the value of electric power input to the other of the two motors 32 and 33, associated with the inner turning one of the two WRL and WRR, whereby the torque of the outer turning wheel is increased with respect to the torque of the inner turning wheel. Inverse to this, electric power input to one of the first and second rear motors 32 and 33, associated with the inner turning one of the left and right rear wheels WRL and WRR, is controlled to a larger value than the value of electric power input to the other of the two motors 32 and 33, associated with the outer turning one of the two WRL and WRR, whereby the torque of the inner turning wheel is increased with respect to the torque of the outer turning wheel.

Furthermore, when the vehicle V is turning during forward decelerating travel thereof, regeneration is performed by the first and second rear motors 32 and 33, and electric power generated by one of the two motors 32 and 33, associated with the inner turning one of the left and right rear wheels WRL and WRR, is controlled to a larger value than the value of electric power generated by the other of the two motors 32 and 33, associated with the outer turning one of the two WRL and WRR, whereby the torque of the outer turning wheel is increased with respect to the torque of the inner turning wheel. Inverse to this, electric power generated by one of the first and second rear motors 32 and 33, associated with the outer turning one of the left and right rear wheels WRL and WRR, is controlled to a larger value than the value of electric power generated by the other of the two motors 32 and 33, associated with the inner turning one of the two WRL and WRR, whereby the torque of the inner turning wheel is increased with respect to the torque of the outer turning wheel.

Further, correspondence between the various types of elements of the second embodiment and the various types of elements of the present invention is as follows: The first and second rear motors 32 and 33 of the second embodiment correspond to the first and second rotating electric machines of the present invention, respectively, and the first and second planetary gear units PS1 and PS2 of the second embodiment correspond to the first and second differential gears of the present invention, respectively. Further, the first sun gear S1, the first carrier C1, and the first ring gear R1 of the second embodiment correspond to the first rotary element, the second rotary element, and the third rotary element of the present invention, respectively, and the second sun gear S2, the second carrier C2, and the second ring gear R2 of the second embodiment correspond to a fourth rotary element, a fifth rotary element, and a sixth rotary element of the present invention, respectively.

Furthermore, the second one-way clutch 5 of the second embodiment corresponds to second and fourth one-way clutches of the present invention, and the inner 34a and the outer 34b of the second embodiment correspond to third and fourth blocking/connecting members of the present invention.

As described heretofore, according to the second embodiment, the first planetary gear unit PS1 includes the first sun gear S1, the first carrier C1, and the first ring gear R1, and is configured such that the rotational speeds of the first sun gear S1, the first carrier C1, and the first ring gear R1 satisfy a collinear relationship in which they are aligned in a single straight line in the collinear chart in the mentioned order. Further, the first sun gear S1 and the first carrier C1 are mechanically connected to the first rear motor 32 and the left rear wheel WRL, respectively, and the first one-way clutch 4 includes the inner 4a and the outer 4b which are mechanically connected to the first sun gear S1 and the first carrier C1, respectively.

Furthermore, the second planetary gear unit PS2 includes the second sun gear S2, the second carrier C2, and the second ring gear R2, and is configured such that the rotational speeds of the second sun gear S2, the second carrier C2, and the second ring gear R2 satisfy a collinear relationship in which they are aligned in a single straight line in the collinear chart in the mentioned order. Further, the second sun gear S2 and the second carrier C2 are mechanically connected to the second rear motor 33 and the right rear wheel WRR, respectively, and the third one-way clutch 34 includes the inner 34a and the outer 34b which are mechanically connected to the second sun gear S2 and the second carrier C2, respectively.

In the case where the first sun gear S1 and the first carrier C1 are performing normal rotation by transmission of the rotational motive power from the first rear motor 32, when the rotational speed of the first sun gear S1 becomes higher than the rotational speed of the first carrier C1, the transmission of the rotational motive power from the inner 4a to the outer 4b of the first one-way clutch 4 is blocked. In the case where the first carrier C1 and the first sun gear S1 are performing normal rotation by transmission of the rotational motive power from the left rear wheel WRL, when the rotational speed of the first sun gear S1 becomes not higher than the rotational speed of the first carrier C1, the transmission of rotational motive power from the outer 4b to the inner 4a is connected.

In the case where the second sun gear S2 and the second carrier C2 are performing normal rotation by transmission of the rotational motive power from the second rear motor 33, when the rotational speed of the second sun gear S2 becomes higher than the rotational speed of the second carrier C2, the transmission of the rotational motive power from the inner 34a to the outer 34b of the third one-way clutch 34 is blocked. Further, in the case where the second carrier C2 and the second sun gear S2 are performing normal rotation by transmission of the rotational motive power from the right rear wheel WRR, when the rotational speed of the second sun gear S2 becomes not higher than the rotational speed of the second carrier C2, the transmission of the rotational motive power from the outer 34b to the inner 34a is connected. Further, the first and second ring gears R1 and R2 are connected such that they perform normal rotation in unison with each other. The second one-way clutch 5 allows the normal rotations of the first and second ring gears R1 and R2 and prevents the reverse rotations of the first and second ring gears R1 and R2.

As described with reference to FIG. 10, when powering is performed by the first rear motor 32, rotational motive power for causing the first sun gear S1 to perform normal rotation is transmitted from the first rear motor 32 to the first sun gear S1, the rotational motive power transmitted to the first sun gear S1 is transmitted to the first carrier C1 using the braking force of the second one-way clutch 5 automatically acting on the first ring gear R1, as a reaction force, and is further transmitted to the left rear wheel WRL. Further, when powering is performed by the second rear motor 33, rotational motive power for causing the second sun gear S2 to perform normal rotation is transmitted from the second rear motor 33 to the second sun gear S2, the rotational motive power transmitted to the second sun gear 32 is transmitted to the second carrier C2 using the braking force of the second one-way clutch 5 automatically acting on the second ring gear R2, as a reaction force, and is further transmitted to the right rear wheel WRR.

From the above, the rotational motive power from the first and second rear motors 32 and 33 is transmitted to the respective left and right rear wheels WRL and WRR in a state reduced in speed by the first and second planetary gear units PS1 and PS2. Further, in this case, the transmission of the rotational motive power from the inner 4a to the outer 4b of the first one-way clutch 4 is automatically blocked, and the transmission of the rotational motive power from the inner 34a to the outer 34b of the third one-way clutch 34 is automatically blocked.

Further, as described with reference to FIG. 11, when regeneration is being performed by the first and second rear motors 32 and 33 using the rotational motive power from the left and right rear wheels WRL and WRR, the rotational motive power from the left and right rear wheels WRL and WRR is transmitted to the first and second ring gears R1 and R2 via the first and second carriers C1 and C2, respectively, and the normal rotations of the first and second ring gears R1 and R2 are automatically allowed by the second one-way clutch 5, whereby the first and second ring gears R1 and R2 idly rotate in the normal rotational direction.

Furthermore, in this case, the rotational speed of the first sun gear S1 is lowered with respect to the rotational speed of the first carrier C1 by a braking force generated by regeneration by the first rear motor 32, whereby the transmission of the rotational motive power from the outer 4b to the inner 4a of the first one-way clutch 4 is automatically connected, which causes the first sun gear S1, the first carrier C1, and the first ring gear R1 to rotate in unison with each other. Further, the rotational speed of the second sun gear S2 is lowered with respect to the rotational speed of the second carrier C2 by a braking force generated by regeneration by the second rear motor 33, whereby the transmission of the rotational motive power from the outer 34b to the inner 34a of the third one-way clutch 34 is automatically connected, which causes the second sun gear S2, the second carrier C2, and the second ring gear R2 to rotate in unison with each other. Thus, it is possible to transmit the rotational motive power transmitted from the left and right rear wheels WRL and WRR to the first, and second carriers C1 and C2, respectively, to the first and second rear motors 32 and 33 via the first and second sun gears S1 and S2, respectively, without transmitting all the rotational motive power to the idly rotating first and second ring gears R1 and R2, and properly convert the rotational motive power to electric power.

As is clear from the above, when switching between regeneration by the first and second rear motors 32 and 33 using the rotational motive power from the rear wheels WRL and WRR, and driving of the rear wheels WRL and WRR by the powering of the first and second rear motors 32 and 33, differently from the above-described conventional power plant, there is no need to switch between braking by the hydraulic brake and release of the braking. Further, the connection/blocking of the transmission of rotational motive power between the inners 4a and 34a and the outers 4b and 34b at the first and third one-way clutches 4 and 34, and the prevention of reverse rotations and allowance of normal rotations of the first and second ring gears R1 and R2 by the second one-way clutch 5 are automatically performed in accordance with a change in the operations of the two motors 32 and 33, and hence it is possible to improve the responsiveness of the switching. Furthermore, since the actuator for actuating the conventional hydraulic brake can be dispensed with, it is possible to reduce the weight of the entire power plant 1, and the manufacturing costs of the entire power plant 1, accordingly. Further, differently from the conventional power plant, since it is possible to prevent occurrence of large dragging losses of the hydraulic brake, the efficiency of the vehicle V can be enhanced.

Furthermore, by controlling the input electric power and the generated electric power at the first and second rear motors 32 and 33, it is possible to generate a torque difference between the left and right rear wheels WRL and WRR, whereby it is possible to enhance the turnability of the vehicle V.

Specifically, as described with reference to FIG. 13, when the vehicle V is turning during forward travel, if the steering angle is relatively large, relatively large electric power is input to one of the first and second rear motors 32 and 33, associated with the outer turning wheel, and relatively small electric power is generated by the other motor associated with the inner turning wheel, whereby the electric power input to the one motor is made considerably larger than the electric power generated by the other motor. With this, in this case, rotational motive power from the one motor is transmitted to the outer turning wheel in a state reduced in speed by the first planetary gear unit PS1, and rotational motive power from the inner turning wheel is transmitted to the second rear motor 33 in a state increased in speed by the second planetary gear unit PS2, and is converted to electric power. Further, since the torque of the outer turning wheel is relatively largely increased with respect to the torque of the inner turning wheel, it is possible to generate a relatively large torque difference between the left and right rear wheels WRL and WRR.

Further, as described with reference to FIG. 14, when the vehicle V is turning during forward travel, if the steering angle is relatively small, very small electric power is input to one of the first and second rear motors 32 and 33, associated with the outer turning wheel, and relatively small electric power is generated by the other motor associated with the inner turning wheel, whereby the electric power generated by the other motor is made slightly larger than the electric power input to the one motor. With this, in this case, part of rotational motive power from the inner turning wheel is distributed, via one of the first and second planetary gear units PS1 and PS2, associated with the inner turning wheel, to the other motor and the other planetary gear unit. The rotational motive power distributed to the other motor is converted to electric power, and the rotational motive power distributed to the other planetary gear unit is transmitted to the outer turning wheel together with rotational motive power from the one motor. Further, since the torque of the outer turning wheel is relatively slightly increased with respect to the torque of the inner turning wheel, it is possible to generate a relatively small torque difference between the left and right rear wheels WRL and WRR.

Furthermore, since the first and second planetary gear units PS1 and PS2 of the existing single pinion type are used, it is possible to reduce the manufacturing costs of the power plant 31. Further, since the first sun gear S1 is connected to the first rear motor 32, and the first carrier C1 is connected to the left rear wheel WRL, respectively, it is possible to transmit the rotational motive power from the first rear motor 32 to the left rear wheel WRL via the first planetary gear unit PS1 in a state largely reduced in speed. Further, since the second sun gear S2 is connected to the second rear motor 33, and the second carrier C2 is connected to the right rear wheel WRR, respectively, it is possible to transmit the rotational motive power from the second rear motor 33 to the right rear wheel WRR via the second planetary gear unit PS2 in a state largely reduced in speed. From the above, it is possible to employ rotating electric machines of which the output torques are relatively small and which are small-sized, as the first and second rear motors 32 and 33.

Further, the first and second one-way clutches 4 and 5 are arranged such that they overlap each other in the direction orthogonal to the rotational axis of the first sun gear S1, the first carrier C1, and the first ring gear R1 (the radial direction of the first planetary gear unit PS1), so that compared with a case where the first and second one-way clutches 4 and 5 are arranged such that they overlap each other in the direction of extension of the rotational axis (axial direction), it is possible to downsize the entire power plant 31 in the axial direction.

Furthermore, since the one-way clutch, which allows the normal rotations of the first and second ring gears R1 and R2, and prevents the reverse rotations thereof, is formed by the second one-way clutch 5, which is single and common to each, compared with a case where one-way clutches for the first and second ring gears R1 and R2 are provided separately from each other, it is possible to achieve downsizing and manufacturing cost reduction of the entire power plant 31.

Figure 15:
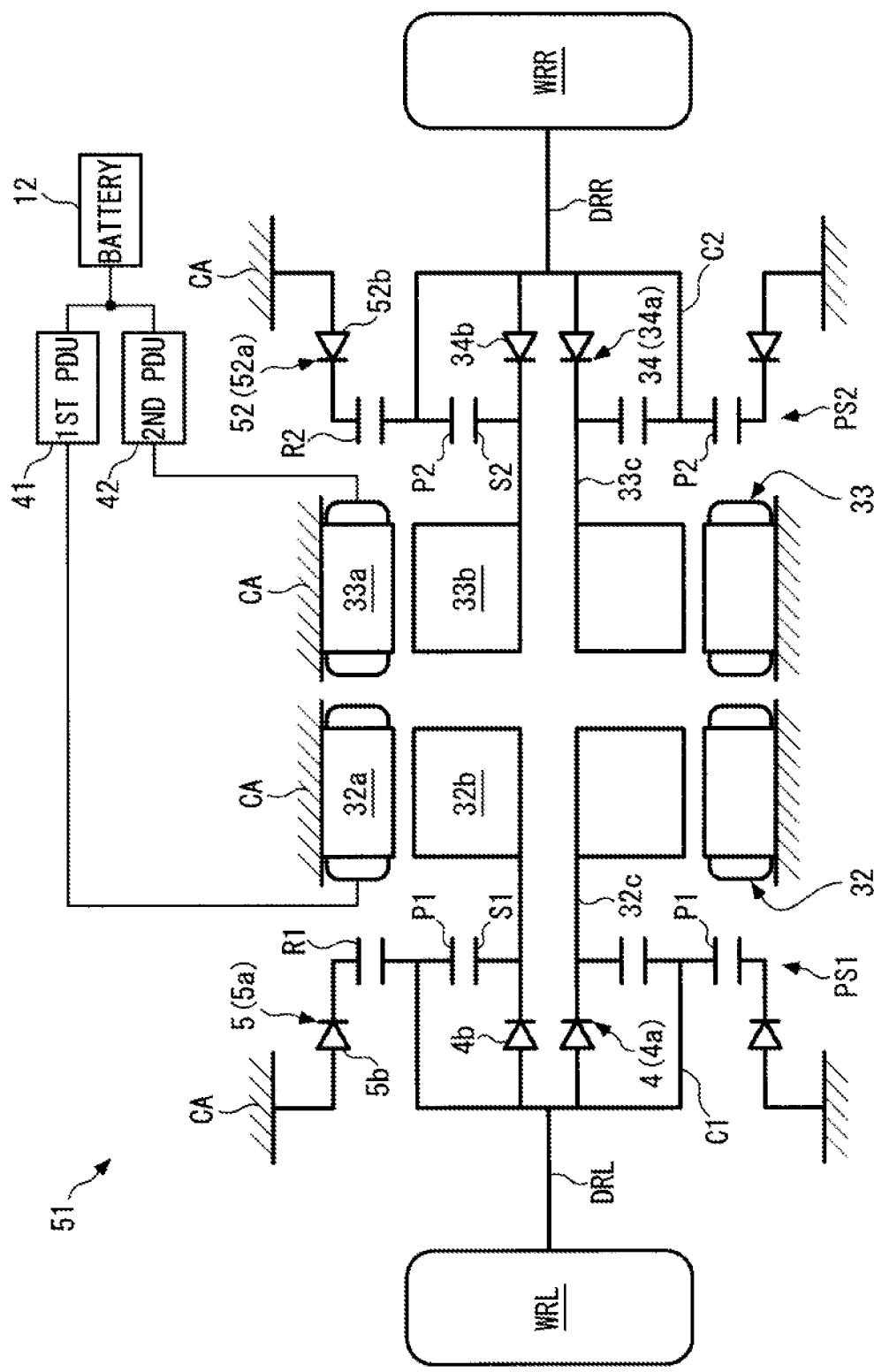
FIG. 15 A skeleton diagram showing a power plant according to a third embodiment of the present invention together with left and right rear wheels of a vehicle to which the power plant is applied.

Next, a power plant 51 according to a third embodiment of the present invention will be described with reference to FIGS. 15 to 18. Compared with the second embodiment, this power plant 51 is mainly different in the positional relationship of the first and second rear motors 32 and 33 and the first and second planetary gear units PS1 and PS2, in that the second one-way clutch 5 is used only for the first ring gear R1, and in that a fourth one-way clutch 52 is provided for the second ring gear R2. In FIG. 15, the same component elements as those of the first and second embodiments are denoted by the same reference numerals. The following description is given mainly of different points from the first and second embodiments.

The first planetary gear unit PS1, the first rear motor 32, the second rear motor 33, and the second planetary gear unit PS2 are arranged between the left and right rear wheels WRL and WRR from the left side in the mentioned order, and are disposed coaxially with each other. Differently from the second embodiment, the rotating shaft 32c of the first rear motor 32 extends leftward from the rotor 32b, and similar to the second embodiment, the rotating shaft 32c is coaxially and integrally formed with the first sun gear S1. Differently from the second embodiment, the first carrier C1 extends leftward from the first pinion gears P1, and similar to the second embodiment, the flange of the first carrier C1 is coaxially attached to the left rear drive shaft DRL. Differently from the second embodiment, the left rear drive shaft DRL extends leftward from the first carrier C1 without being fitted inside the rotating shaft 32c and the first one-way clutch 4.

Differently from the case of the second embodiment, the first and second ring gears R1 and R2 are not connected to each other, and the inner 5a of the second one-way clutch 5 is coaxially attached to the first ring gear R1. Further, the second one-way clutch 5 is arranged such that it overlaps the first one-way clutch 4 in the radial direction of the first planetary gear unit PS1, i.e. in the direction orthogonal to the rotational axis of the first sun gear S1, the first carrier C1, and the first ring gear R1.

In the second one-way clutch 5, when a torque that causes normal rotation is transmitted to the first ring gear R1, the engagement between the rollers and the inner 5a and the outer 5b is released, as described hereinbefore, whereby the normal rotation of the first ring gear R1 is allowed. Further, when a torque that causes reverse rotation is transmitted to the first ring gear R1, the rollers are engaged with the inner 5a and the outer 5b, whereby the reverse rotation of the first ring gear R1 is prevented.

Further, differently from the second embodiment, the rotating shaft 33c of the second rear motor 33 extends rightward from the rotor 33b, and similar to the second embodiment, the rotating shaft 33c is coaxially and integrally formed with the second sun gear S2. Differently from the second embodiment, the second carrier C2 extends rightward from the second pinion gears P2, and similar to the second embodiment, the flange of the second carrier C2 is coaxially attached to the right rear drive shaft DRR. Differently from the second embodiment, the right rear drive shaft DRR extends rightward from the second carrier C2 without being fitted inside the rotating shaft 33c and the third one-way clutch 34.

The fourth one-way clutch 52 is constructed similar to the second one-way clutch 5, and includes an annular inner 52a, an annular outer 52b, and a plurality of rollers and springs (none of which are shown). Each roller is movable between an engaged position where the roller is engaged with the inner 52a and the outer 52b, and a retracted position where the roller is disengaged from the two 52a and 52b. Further, the inner 52a is coaxially attached to the second ring gear R2, and is basically rotatable in unison with the second ring gear R2. The second carrier C2 is relatively rotatably provided inside the inner 52a. The outer 52b is fixed to the casing CA. Furthermore, the fourth one-way clutch 52 is arranged such that it overlaps the third one-way clutch 34 in a radial direction of the second planetary gear unit PS2, i.e. in a direction orthogonal to the rotational axis of the second sun gear S2, the second carrier C2, and the second ring gear R2.

In the fourth one-way clutch 52 constructed as above, when a torque that causes normal rotation is transmitted to the second ring gear R2, the rollers are moved to their above-mentioned retracted positions by being pressed via their surfaces in contact with one of the inner 52a and the outer 52b, causing release of the engagement thereof with the two 52a and 52b. As a consequence, the normal rotation of the second ring gear R2 is allowed. Further, when a torque that causes reverse rotation is transmitted to the second ring gear R2, the rollers are moved to their above-mentioned engaged positions by being pressed via their surfaces in contact with the one of the inner 52a and the outer 52b, causing engagement thereof with the two 52a and 52b. As a consequence, the reverse rotation of the second ring gear R2 is prevented.

Similar to the case of the second embodiment, the ECU 2 selects one of travel modes of the vehicle V based on the detection signals from the aforementioned sensors 21 to 23 and 43, according to control programs stored in the ROM, and controls the operations and the like of the engine ENG, the front motor FrM, and the first and second rear motors 32 and 33 based on the selected travel mode. As the travel modes, similar to the first embodiment, the EV standing start mode, the ENG travel mode, the EV cruise mode, the power acceleration mode, the ENG cruise mode, the decelerating regeneration mode, and the 4 WD travel mode are provided.

Next, the operations of the power plant 51 in the above-mentioned travel modes will be described with reference to FIGS. 16 to 18. As described hereinabove, compared with the second embodiment, this power plant 51 is different in that the first and second ring gears R1 and R2 are not connected to each other, and that the inner 5a of the second one-way clutch 5 and the inner 52a of the fourth one-way clutch 52 are attached to the first and second ring gears R1 and R2, respectively. Therefore, a rotational speed relationship and a torque balance relationship between the various types of rotary elements of the power plant 51 are expressed e.g. in collinear charts shown in FIGS. 16 to 18.

Figure 16:
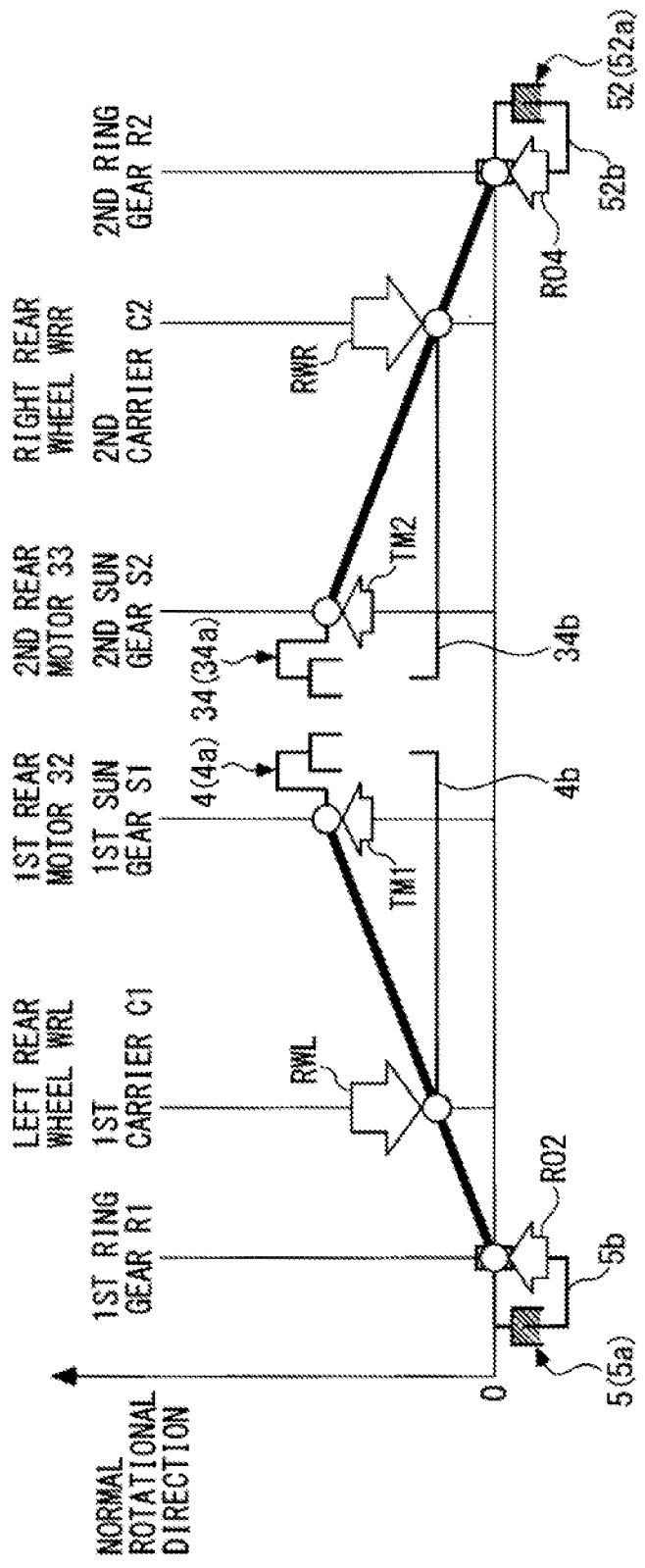
FIG. 16 A collinear chart showing a rotational speed relationship and a torque balance relationship between various types of rotary elements of the power plant shown in FIG. 15, during travel modes for causing the vehicle to travel forward using the first and second rear motors as motive power sources.

FIG. 16 shows an example of a rotational speed relationship and a torque balance relationship between the various types of rotary elements in the travel modes which use the first and second rear motors 32 and 33 as motive power sources, i.e. the EV standing start mode, the EV cruise mode, the power acceleration mode, and the 4 WD travel mode. In these travel modes, similar to the case of the second embodiment, powering of the first and second rear motors 32 and 33 is performed, and the directions of the rotations of the rotors 33b and 33b of the first and second rear motors 32 and 33 are controlled to the normal rotational direction. Further, electric power input to the first and second rear motors 32 and 33 is controlled such that the torques of the two 32 and 33 become equal to each other. In FIG. 16, RO4 represents a reaction force torque of the fourth one-way clutch 52. The other parameters are as described hereinabove.

As is apparent from a comparison between FIG. 10, referred to in the description of the second embodiment, and FIG. 16, the first rear motor powering torque TM1 transmitted to the first sun gear S1 is transmitted to the first carrier C1 using the reaction force torque RO2 of the second one-way clutch 5 acting on the first ring gear R1 as a reaction force, and is further transmitted to the left rear wheel WRL. Further, the second rear motor powering torque TM2 transmitted to the second sun gear S2 is transmitted to the second carrier C2 using the reaction force torque RO4 of the fourth one-way clutch 52 acting on the second ring gear R2 as a reaction force, and is further transmitted to the right rear wheel WRR.

In this case as well, the transmission of the rotational motive power from the inner 4a to the outer 4b of the first one-way clutch 4 is blocked, and the transmission of the rotational motive power from the inner 34a to the outer 34b of the third one-way clutch 34 is blocked. Further, the rotational motive power from the first rear motor 32 is transmitted to the left rear wheel WRL in a state reduced in speed at the speed reduction ratio of the first planetary gear unit PS1, and the rotational motive power from the second rear motor 33 is transmitted to the right rear wheel WRR in a state reduced in speed at the speed reduction ratio of the second planetary gear unit PS2.

Note that in FIG. 16, similar to FIG. 10, the blocking of the transmission of the rotational motive power from the inner 4a to the outer 4b of the first one-way clutch 4 is represented by drawing the two 4a and 4b apart from each other, and the blocking of the transmission of the rotational motive power from the inner 34a to the outer 34b of the third one-way clutch 34 is represented by drawing the two 34a and 34b apart from each other. Further, the engagement of the inner 5a and the outer 5b of the second one-way clutch 5 with each other via the rollers is represented by drawing the two 5a and 5b such that the two 5a and 5b partially overlap each other, and hatching overlapping portions thereof, and the engagement of the inner 52a and the outer 52b of the fourth one-way clutch 52 with each other via the rollers is represented by drawing the two 52a and 52b such that the 52a and 52b partially overlap each other, and hatching overlapping portions thereof.

Figure 17:
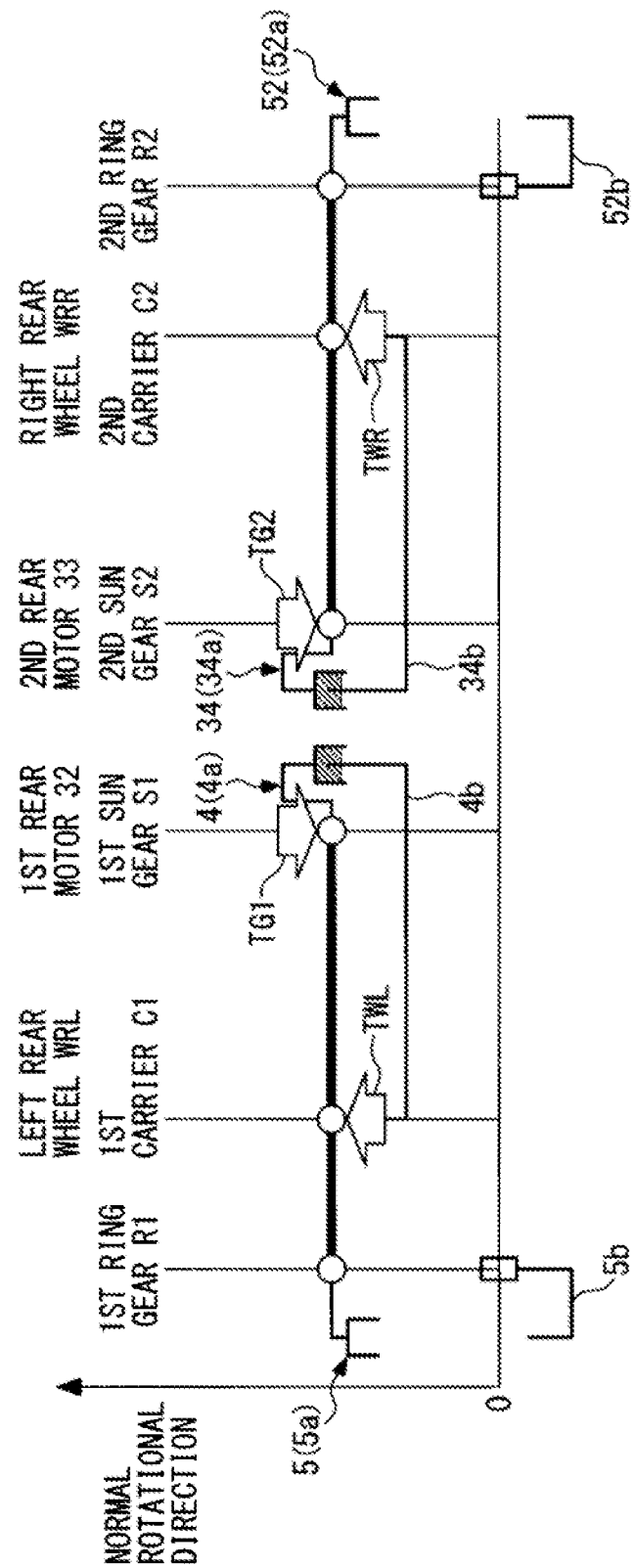
FIG. 17 A collinear chart showing a rotational speed relationship and a torque balance relationship between the various types of rotary elements of the power plant shown in FIG. 15, during the decelerating regeneration mode.

Further, FIG. 17 shows an example of a rotational speed relationship and a torque balance relationship between the various types of rotary elements in the decelerating regeneration mode. In the decelerating regeneration mode, similar to the case of the second embodiment, regeneration by the first rear motor 32 is performed using the rotational motive power from the left rear wheel WRL, and regeneration by the second rear motor 33 is performed using the rotational motive power from the right rear wheel WRR. Also, electric power generated by the first and second rear motors 32 and 33 is charged into the battery 12. Various parameters appearing in FIG. 17 are as described hereinabove.

As is apparent, from a comparison between FIG. 11 referred to in the description of the second embodiment, and FIG. 17, in this case as well, the transmission of the rotational motive power from the outer 4b to the inner 4a of the first one-way clutch 4 is connected, whereby the first sun gear S1, the first carrier C1, and the first ring gear R1 are caused to rotate in unison with each other, and the transmission of the rotational motive power from the outer 34b to the inner 34a of the third one-way clutch 34 is connected, whereby the second sun gear S2, the second carrier C2, and the second ring gear R2 are caused to rotate in unison with each other.

As a consequence, similar to the case of the second embodiment, rotational motive power transmitted from the left and right rear wheels WRL and WRR to the first and second carriers C1 and C2, respectively, is transmitted to the first and second rear motors 32 and 33 via the first and second sun gears S1 and S2, respectively, without all being transmitted to the idly rotating first, and second ring gears R1 and R2, and is converted to electric power by regeneration by the first and second rear motors 32 and 33.

Note that, similar to FIG. 11, in FIG. 17, the connection of the transmission of the rotational motive power from the outer 4b to the inner 4a of the first one-way clutch 4 is represented by drawing the two 4b and 4a such that the two 4b and 4a partially overlap each other, and hatching overlapping portions thereof, and the connection of the transmission of the rotational motive power from the outer 34b to the inner 34a of the third one-way clutch 34 is represented by drawing the two 34b and 34a such that the two 34b and 34a partially overlap each other, and hatching overlapping portions thereof. Further, the release of the engagement between the inner 5a and the outer 5b of the second one-way clutch 5 is represented by drawing the two 5a and 5b apart from each other, and the release of the engagement between the inner 52a and the outer 52b of the fourth one-way clutch 52 is represented by drawing the two 52a and 52b apart from each other.

Figure 18:
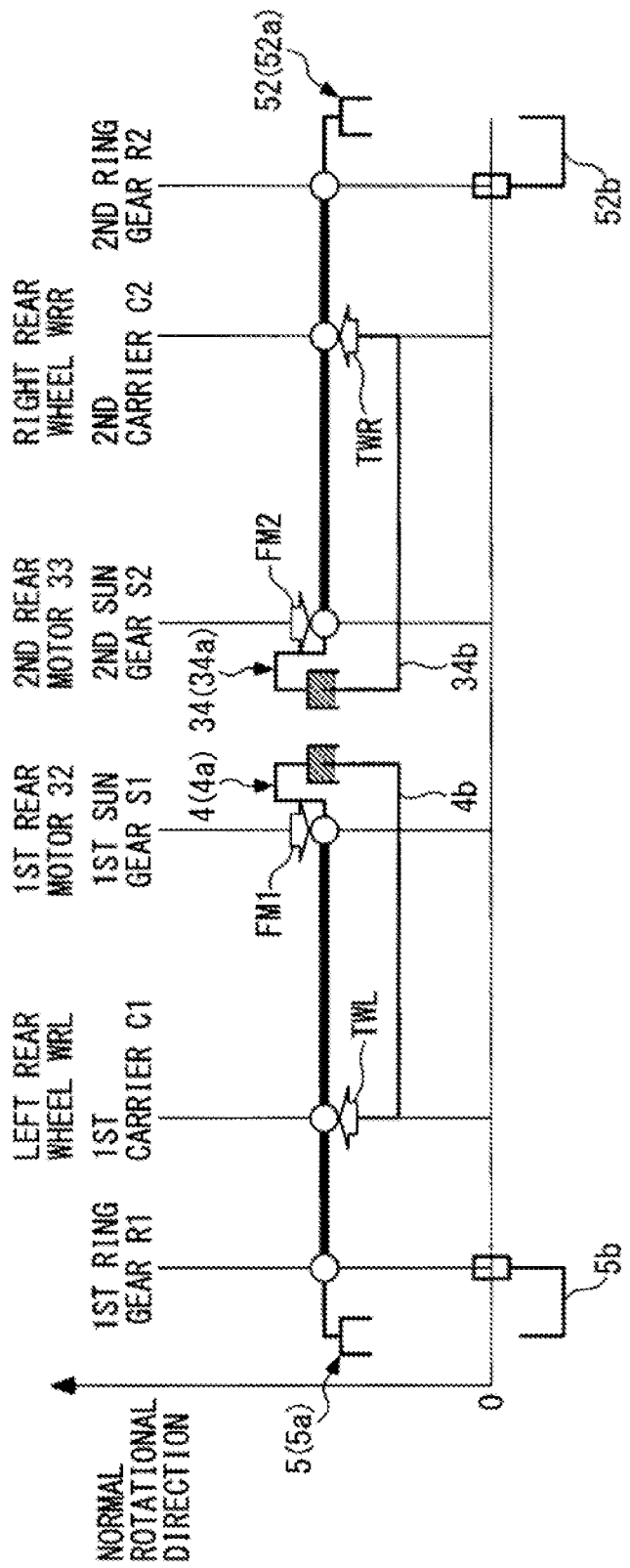
FIG. 18 A collinear chart showing a rotational speed relationship and a torque balance relationship between the various types of rotary elements of the power plant shown in FIG. 15, during travel modes for causing the vehicle to travel forward using a motive power source other than the first and second rear motors.

Further, FIG. 18 shows an example of a rotational speed relationship and a torque balance relationship between the various types of rotary elements in the travel modes which do not use the first and second rear motors 32 and 33 as motive power sources, i.e. the ENG travel mode and the ENG cruise mode. In this case, similar to the case of the second embodiment, the first and second PDUs 41 and 42 are controlled such that no electric current flows through the stators 32a and 33a of the first and second rear motors 32 and 33. Various parameters appearing in FIG. 18 are as described hereinabove.

As is apparent from a comparison between FIG. 12 referred to in the description of the second embodiment, and FIG. 18, in this case as well, the transmission of the rotational motive power from the outer 4b to the inner 4a of the first one-way clutch 4 is connected, whereby the first sun gear S1, the first carrier C1, and the first ring gear R1 are caused to rotate in unison with each other, and the transmission of the rotational motive power from the outer 34b to the inner 34a of the third one-way clutch 34 is connected, whereby the second sun gear S2, the second carrier C2, and the second ring gear R2 are caused to rotate in unison with each other. Therefore, similar to the case of the second embodiment, it is possible to reduce the frictions of the first and second rear motors 32 and 33 acting on the respective left and right rear wheels WRL and WRR, which in turn makes it possible to enhance the efficiency of the vehicle V.

Further, in the power plant 51, when the vehicle V is turning during forward travel, similar to the case of the second embodiment, powering is performed by the first and second rear motors 32 and 33, and electric power input to one of the two motors 32 and 33, associated with the outer turning one of the left and right rear wheels WRL and WRR, is controlled to a larger value than the value of electric power input to the other of the two motors 32 and 33, associated with the inner turning one of the two WRL and WRR, whereby the torque of the outer turning wheel is increased with respect to the torque of the inner turning wheel, and a torque difference is generated between the left and right rear wheel WRL and WRR. Inverse to this, electric power input to one or the first and second rear motors 32 and 33, associated with the inner turning one of the left and right rear wheels WRL and WRR, is controlled to a larger value than the value of electric power input to the other of the two motors 32 and 33, associated with the outer turning one of the two WRL and WRR, whereby the torque of the inner turning wheel is increased with respect to the torque of the outer turning wheel.

Furthermore, when the vehicle V is turning during forward decelerating travel thereof, similar to the case of the second embodiment, regeneration is performed by the first and second rear motors 32 and 33, and electric power generated by one of the two motors 32 and 33, associated with the inner turning one of the left and right rear wheels WRL and WRR, is controlled to a larger value than the value of electric power generated by the other of the two motors 32 and 33, associated with the outer turning one of the two WRL and WRR, whereby the torque of the outer turning wheel is increased with respect to the torque of the inner turning wheel. Inverse to this, electric power generated by one of the first and second rear motors 32 and 33, associated with the outer turning one of the left and right rear wheels WRL and WRR, is controlled to a larger value than the value of electric power generated by the other of the two motors 32 and 33, associated with the inner turning one of the two WRL and WRR, whereby the torque of the inner turning wheel is increased with respect to the torque of the outer turning wheel.

Further, correspondence between the various types of elements of the third embodiment and the various types of elements of the present invention is different from the second embodiment only in that the second and fourth one-way clutches 5 and 52 of the third embodiment correspond to the second and fourth one-way clutches of the present invention, respectively, and the remainder of the correspondence is the same as in the second embodiment.

From the above, according to the third embodiment, it is possible to obtain the same advantageous effects as provided by the second embodiment, that is, the enhancement of the responsiveness of switching between the regeneration by the first and second rear motors 32 and 33 using the rotational motive power from the rear wheels WRL and WRR, and the driving of the rear wheels WRL and WRR by the powering of the first and second rear motors 32 and 33.

Further, the third and fourth one-way clutches 34 and 52 are arranged such that they overlap each other in the direction orthogonal to the rotational axis of the second sun gear S2, the second carrier C2, and the second ring gear R2 (the radial direction of the second planetary gear unit PS2), and hence compared with a case where the third and fourth one-way clutches 34 and 52 are arranged such that they overlap each other in the direction of extension of the rotational axis (axial direction), it is possible to downsize the entire power plant 51 in the axial direction.

Note that the present invention is by no means limited to the above-described first to third embodiments (hereinafter, generically referred to as "the embodiments") but can be practiced in various forms. For example, although in the first embodiment and in the second and third embodiments, the planetary gear unit PS and the first planetary gear unit PS1 of the single pinion type are used as the first differential gear of the present invention, respectively, there may be used any other suitable differential gear, for example, a planetary gear unit of a double pinion type or a differential gear of a bevel gear type. Alternatively, a planetary gear unit may be used which includes two sun gears, a double pinion gear that integrally includes first pinion gears and second pinion gears in mesh with one and the other of the two sun gears, respectively, and a rotatable carrier that rotatably supports the double pinion gear. The above variations of the first differential gear similarly apply to the second differential gear (the second planetary gear unit PS2) of the present invention.

Further, although in the embodiments, as the first rotating electric machine of the present invention, the rear motor 3 and the first rear motor 32, which are AC motors, are used in the first embodiment and in the second and third embodiments, respectively, any other suitable rotating electric machine, for example, a DC motor, may be used. This similarly applies to the second rotating electric machine (the second rear motor 33) of the present invention. Furthermore, although in the embodiments, as the first one-way clutch of the present invention, the first one-way clutch 4 of the roller type is used, one-way clutch of any other suitable type, for example, a sprag type one-way clutch, may be used. This similarly applies to the second to fourth one-way clutches (5, 34, and 52) of the present invention.

Further, although in the embodiments, the first and second one-way clutches 4 and 5 are arranged such that they overlap each other in the direction orthogonal to the rotational axis of the first sun gear S1, the first carrier C1, and the first ring gear R1, they may be arranged such that they do not overlap each other. Alternatively, as to the second embodiment, the second one-way clutch 5 may be arranged such that it overlaps the third one-way clutch 34 in the direction orthogonal to the rotational axis of the second sun gear S2, the second carrier C2, and the second ring gear R2. Further, although in the third embodiment, the third and fourth one-way clutches 34 and 52 are arranged such that they overlap each other in the direction orthogonal to the rotational axis of the second sun gear S2, the second carrier C2, and the second ring gear R2, they may be arranged such that they do not overlap each other.

Further, although in the embodiments, the power plants 1, 31, and 51 are applied to a hybrid four-wheel vehicle, they may be applied to a vehicle which has no engine as a motive power source installed thereon. Further, the number of the wheels can be set as desired. It is to be further understood that various changes and modifications may be made without departing from the spirit and scope of the invention.

REFERENCE SIGNS LIST

WRL left rear wheel (wheel)
WRR right rear wheel (wheel)
1 power plant
3 rear motor (first rotating electric machine)
4 first one-way clutch
4a inner (first blocking/connecting member)
4b outer (second blocking/connecting member)
5 second one-way clutch (fourth one-way clutch)
PS planetary gear unit (first differential gear, first planetary gear unit)

S sun gear (first rotary element, first sun gear S1)
C carrier (second rotary element, first carrier C1)
R ring gear (third rotary element, first ring gear R1)
31 power plant
32 first rear motor (first rotating electric machine)
33 second rear motor (second rotating electric machine)
34 third one-way clutch
34a inner (third blocking/connecting member)
34b outer (fourth blocking/connecting member)
PS1 first planetary gear unit (first differential gear)
S1 first sun gear (first rotary element)
C1 first carrier (second rotary element)
R1 first ring gear (third rotary element)
PS2 second planetary gear unit (second differential, gear)
S2 second sun gear (fourth rotary element)
C2 second carrier (fifth rotary element)
R2 second ring gear (sixth rotary element)
51 power plant
52 fourth one-way clutch

The invention claimed is:

1. A power plant for driving wheels, comprising:
a first rotating electric machine that is capable of performing powering which converts input electric power to rotational motive power, for output, and regeneration which converts input rotational motive power to electric power;
a first differential gear that includes a first rotary element, a second rotary element, and a third rotary element which are rotatable about a first rotational axis, and is configured such that rotational speeds of the first to third rotary elements satisfy a collinear relationship in which the rotational speeds of the first to third rotary elements are aligned in a single straight line in a collinear chart in the mentioned order, the first rotary element being mechanically connected to the first rotating electric machine, and the second rotary element being mechanically connected to the wheels;
a first one-way clutch that includes a first blocking/connecting member and a second blocking/connecting member which are mechanically connected to the first and second rotary elements, respectively, and is configured such that in a case where the first and second rotary elements rotate in a first predetermined rotational direction by transmission of rotational motive power from the first rotating electric machine, when a rotational speed of the first rotary element becomes higher than a rotational speed of the second rotary element, transmission of rotational motive power from the first blocking/connecting member to the second blocking/connecting member is blocked, whereas in a case where the second and first rotary elements rotate in the first predetermined rotational direction by transmission of rotational motive power from the wheels, when the rotational speed of the first rotary element becomes not higher than the rotational speed of the second rotary element, transmission of rotational motive power from the second blocking/connecting member to the first blocking/connecting member is connected; and
a second one-way clutch that is configured to allow the third rotary element to rotate in the first predetermined rotational direction, and prevent the third rotary element from rotating in a direction opposite to the first predetermined rotational direction.

2. The power plant according to claim 1, wherein the first differential gear is formed by a first planetary gear unit of a single pinion type, and wherein the first rotary element, the second rotary element, and the third rotary element are a first sun gear, a first carrier, and a first ring gear of the first planetary gear unit, respectively.

3. The power plant according to claim 1, wherein the first and second one-way clutches are arranged such that the first and second one-way clutches overlap each other in a direction orthogonal to the first rotational axis.

4. The power plant according claim 1, wherein the wheels are formed by a pair of left and right wheels, and
wherein the second rotary element is mechanically connected to the left wheel,
the power plant further comprising:
a second rotating electric machine that is provided separately from the first rotating electric machine, and is capable of performing powering which converts input electric power to rotational motive power, for output, and regeneration which converts input rotational motive power to electric power;
a second differential gear that includes a fourth rotary element, a fifth rotary element, and a sixth rotary element which are rotatable about a second rotational axis, and is configured such that rotational speeds of the fourth to sixth rotary elements satisfy a collinear relationship in which the rotational speeds of the fourth to sixth rotary elements are aligned in a single straight line in a collinear chart in the mentioned order, the fourth rotary element being mechanically connected to the second rotating electric machine, and the fifth rotary element being mechanically connected to the right wheel;
a third one-way clutch that includes a third blocking/connecting member and a fourth blocking/connecting member which are mechanically connected to the fourth and fifth rotary elements, respectively, and is configured such that in a case where the fourth and fifth rotary elements rotate in a second predetermined rotational direction by transmission of rotational motive power from the second rotating electric machine, when a rotational speed of the fourth rotary element becomes higher than a rotational speed of the fifth rotary element, transmission of rotational motive power from the third blocking/connecting member to the fourth blocking/connecting member is blocked, whereas in a case where the fifth and fourth rotary elements rotate in the second predetermined rotational direction by transmission of rotational motive power from the right wheel, when the rotational speed of the fourth rotary element becomes not higher than the rotational speed of the fifth rotary element, transmission of rotational motive power from the fourth blocking/connecting member to the third blocking/connecting member is connected; and
a fourth one-way clutch that is configured to allow the sixth rotary element to rotate in the second predetermined rotational direction, and prevent the sixth rotary element from rotating in a direction opposite to the second predetermined rotational direction.

5. The power plant according to claim 4, wherein the second differential gear is formed by a second planetary gear unit of the single pinion type, and
wherein the fourth rotary element, the fifth rotary element, and the sixth rotary element are a second sun gear, a second carrier, and a second ring gear of the second planetary gear unit, respectively.

6. The power plant according to claim 4, wherein the third and fourth one-way clutches are arranged such that the third and fourth one-way clutches overlap each other in a direction orthogonal to the second rotational axis.

7. The power plant according to claim 4, wherein the first and second rotation axes coincide with each other,
wherein the first and second predetermined rotational directions are set to the same rotational direction,
wherein the second and fourth one-way clutches are formed by a single one-way clutch common to each, and
wherein the third and sixth rotary elements are connected via the one-way clutch such that the third and sixth, rotary elements rotate in unison with each other in the first and second predetermined rotational directions.

* * * * *